(12) United States Patent
Peron

(10) Patent No.: US 11,811,322 B2
(45) Date of Patent: Nov. 7, 2023

(54) POWER CONVERTER WITH A RESONANT UNIT

(71) Applicant: FORSEE POWER, Ivry-sur-Seine (FR)

(72) Inventor: Benoît Peron, Tours (FR)

(73) Assignee: FORSEE POWER, Paris (FR)

( * ) Notice: Subject to any disclaimer, the term of this patent is extended or adjusted under 35 U.S.C. 154(b) by 0 days.

(21) Appl. No.: 16/499,062

(22) PCT Filed: Apr. 3, 2018

(86) PCT No.: PCT/EP2018/058510
§ 371 (c)(1),
(2) Date: Sep. 27, 2019

(87) PCT Pub. No.: WO2018/178403
PCT Pub. Date: Oct. 4, 2018

(65) Prior Publication Data
US 2021/0111627 A1    Apr. 15, 2021

(30) Foreign Application Priority Data
Mar. 31, 2017    (FR) .................... 17/52826

(51) Int. Cl.
*H02M 3/158* (2006.01)
*H02M 1/00* (2006.01)

(52) U.S. Cl.
CPC ....... *H02M 3/1582* (2013.01); *H02M 1/0054* (2021.05); *H02M 1/0058* (2021.05)

(58) Field of Classification Search
CPC ...... H02M 3/1582; H02M 3/158; H02M 1/42; H02M 2001/0048–2001/0058
See application file for complete search history.

(56) References Cited

U.S. PATENT DOCUMENTS

| 4,730,242 A | 3/1988 | Divan | |
|---|---|---|---|
| 5,532,919 A * | 7/1996 | Gegner | H02M 3/158 363/124 |
| 5,594,635 A * | 1/1997 | Gegner | H02M 3/337 363/124 |
| 9,748,845 B1 * | 8/2017 | Kotikalapoodi | H03F 1/0238 |

(Continued)

FOREIGN PATENT DOCUMENTS

| CA | 1293021 C | 12/1991 |
|---|---|---|
| CA | 2418042 A1 | 3/2002 |

(Continued)

OTHER PUBLICATIONS

International Search Report for Application No. PCT/EP2018/058510.

(Continued)

*Primary Examiner* — Gustavo A Rosario-Benitez
(74) *Attorney, Agent, or Firm* — CANTOR COLBURN LLP

(57) ABSTRACT

The present invention relates to a bi-directional power converter (100) for converting an input voltage into an output voltage. The bi-directional power converter (100) may comprise a primary switching unit having a primary switching frequency and a secondary switching unit having a secondary switching frequency: the primary switching frequency being lower than the secondary switching frequency.

17 Claims, 8 Drawing Sheets

(56) References Cited

U.S. PATENT DOCUMENTS

| | | | |
|---|---|---|---|
| 9,923,466 B2 | 3/2018 | Yu et al. | |
| 2001/0024373 A1* | 9/2001 | Cuk | H02M 3/33561 363/16 |
| 2004/0037100 A1* | 2/2004 | Orr | H02M 3/33576 363/131 |
| 2004/0264214 A1* | 12/2004 | Xu | H02M 3/33576 363/16 |
| 2005/0226012 A1* | 10/2005 | Jovanovic | H02M 3/156 363/59 |
| 2006/0176719 A1* | 8/2006 | Uruno | H02M 3/158 363/89 |
| 2007/0018617 A1* | 1/2007 | Endo | H02M 3/158 323/222 |
| 2008/0100273 A1* | 5/2008 | Uruno | H02M 1/4208 323/282 |
| 2010/0226050 A1 | 9/2010 | Koo et al. | |
| 2011/0254461 A1* | 10/2011 | Summerland | H05B 45/382 333/32 |
| 2012/0039100 A1* | 2/2012 | Hirose | B60L 3/0007 363/50 |
| 2013/0121033 A1* | 5/2013 | Lehn | H02M 3/33569 363/16 |
| 2013/0249514 A1* | 9/2013 | Huang | H02M 3/1582 323/282 |
| 2013/0314070 A1 | 11/2013 | Shinohara et al. | |
| 2014/0139128 A1* | 5/2014 | Tsai | H02M 3/155 315/200 R |
| 2015/0069958 A1* | 3/2015 | Yang | H02J 7/007 320/107 |
| 2016/0190932 A1 | 6/2016 | Yu et al. | |
| 2017/0012452 A1* | 1/2017 | Kang | H02J 7/02 |
| 2018/0212545 A1* | 7/2018 | Xu | H02P 27/06 |
| 2018/0287498 A1* | 10/2018 | Yu | H02M 3/1584 |
| 2018/0316268 A1* | 11/2018 | Liu | H02M 1/08 |
| 2019/0109530 A1* | 4/2019 | Perreault | H02M 3/158 |
| 2019/0267895 A1* | 8/2019 | Masuda | H02M 3/158 |
| 2023/0042403 A1* | 2/2023 | Glovinsky | H02J 4/00 |

FOREIGN PATENT DOCUMENTS

| | | |
|---|---|---|
| CN | 1470097 A | 1/2004 |
| CN | 102447295 A | 5/2012 |
| CN | 103427641 A | 12/2013 |
| DE | 102009014386 A1 | 9/2010 |
| DE | 102013218228 A1 | 3/2015 |
| EP | 3595155 A1 * | 1/2020 ......... H02M 3/1582 |

OTHER PUBLICATIONS

Written Opinion for Application No. PCT/EP2018/058510.
English Machine Translation to DE102009014386.
First Office Action dated Aug. 25, 2022; Chinese Application No. 201880028452.7; 8 pages (English translation Included).
Search Report dated Aug. 17, 2022; Chinese Application No. 2018800284527; 2 pages.
Search Report dated Dec. 6, 2017; French Application No. 1752826; 2 pages.
Written Opinion dated Dec. 6, 2017; French Application No. 1752826; 5 pages (non-English).
Second Chinese Office Action dated Mar. 24, 2023; CN Application No. 201880028452.7; 4 pages (non-English).
Second Chinese Office Action dated Mar. 24, 2023; CN Application No. 201880028452.7; 6 pages (English translation).

* cited by examiner

# POWER CONVERTER WITH A RESONANT UNIT

CROSS REFERENCE TO RELATED APPLICATIONS

This application is a National Stage of PCT Application No. PCT/EP2018/058510 filed on Apr. 3, 2018, which claims priority to France Patent Application No. 17/52826 filed on Mar. 31, 2017, the contents each of which are incorporated herein by reference thereto.

TECHNICAL FIELD OF THE INVENTION

The present invention relates to a power converter for converting an input power into an output power, a boost process and/or a buck process for converting an input power into an output power. More particularly, the present invention is dedicated, but not exclusively, to electrical traction systems able to drive electrical motors and to recover kinetic energy towards the embedded Energy Storage Systems.

STATE OF THE ART

As the technologies of batteries and supercapacitors were improved over the last decades, electric vehicles have become an attractive solution with an economic reality. Moreover, due to the commitment of several countries around the world to respect the COP21 act, traditional full gasoline vehicle may be abandoned replacing by electrical solution. One of the first application will be the public transport like bus and tramway systems for example. In these applications, high power is required to supply the traction units.

This involves a parallel connection of supercapacitors and batteries that is more generally called Energy Storage Elements, also know as ESE. This electrical configuration can be achieved thanks to a high power converter (100) that manages energy between traction units and several ESEs. This electrical solution is distinguished by its ability to recover the kinetic energy, so that allows improving significantly the global system efficiency. These criteria may involve using a bidirectional high power converter with a high efficiency.

These bidirectional high power converters work at high voltage and the risk of faults occurring on the power semiconductor, at this voltage level, is linked to the cosmic rays effect depends on altitude and DC bias voltage. For example, the MTBF, an acronym for "Mean Time Between Failure", for one high voltage component may be around 15 years for some market whereas it should be higher than 30 years for railway applications. Thus, the FIT value, short for "Failure In Time", due to the cosmic rays effect from power semiconductor should be well analyzed versus the final applications. Sometimes it is mandatory to use higher voltage breakdown voltage to respect the MTBF expectation. It is obvious that using 1.7 kV Insulated Gate Bipolar Transistors, IGBT for short, instead 1.2 kV IGBT have a huge consequence on the switching frequency for the same power losses. This involves a consequence on the size and the weight of the systems.

An alternative may be the use of Silicon carbide power modules, SiC power modules for short, which are often considered to improve efficiency and size of the power converter. However, these components are new on the market and there are no feedbacks on their ability to work under a large temperature range over a long time period especially in the applications in which there are thermal cycling constraints. Moreover, their cost remains higher than the standard Silicon power modules. To address the market of the public electrical vehicles for example, needing high current repetitive quick charge, under a competitive market, full SiC power modules cannot be yet considered.

Indeed, due to the random high power cycles, the thermal cycling of the semiconductor should be considered during the power converter design. Those thermal stresses are due to the quick charges from the kinetic energy recovery, during braking phase, due to the high sourcing inrush current required by the traction units, and/or due to the low power consumption from the Heating Ventilation Air Conditioning for instance.

To reduce joule losses in the electrical wires connections, serial combination of the ESE is used, involving a high voltage, around 0.9 kV, across the power converter. This voltage leads a specific attention about the life time of the semiconductor due to the combination of the cosmic ray versus the junction operating voltage; the immunity of the SiC and Si components should be study to not affect the reliability of the system which become crucial for land transport as bus, tramways, trains, air transport such as aircraft, and sea transport like boat.

As power converter is embedded in rolling stock, size and weight should be considered to find the best electrical topology. As a consequence, a high switching frequency topology will be considered.

On top of that, in public transport system particularly, the quick recharges of the ESEs occur during brief stops when the passengers go up and down which can generate a high audible noise due to the magnetrostriction effect of the magnetic elements and may annoy the passengers.

In several soft switching power converters, it is often impossible to work without any loads because the snubber capacitors are fast discharged through the power semiconductors. This loss reduces the lifetime of the system.

SUMMARY OF THE INVENTION

In order to achieve this objective, the present invention may provide, according to a aspect of the invention, a boost or buck power converter (100) for converting a input primary power having a input primary voltage (201) and a input primary current (202) into a output secondary power having a output secondary voltage (203) and output secondary current (204) or a input secondary power having said input secondary voltage (291) and a input secondary current (292) into a output primary power having a output primary voltage (293) and second primary current (294) respectively; said power converter (100) including at least one:
  primary switching arrangement (130) comprising at least one primary switching unit (131, 135) having a primary dynamical switching loss;
  secondary switching arrangement (170) comprising at least one secondary switching unit (171, 175) having a secondary dynamical switching loss; and,
  resonant unit (150) connecting said at least one primary switching unit (131, 135) and said at least one secondary switching unit (171, 175);
  said primary dynamical switching loss being higher than said secondary dynamical switching loss.

Thus, this arrangement improves the efficiency, the lifetime, the reliability, the thermal resistance of the primary arrangement versus the secondary arrangement and the audible noise while reducing the size. Further, this arrangement improves the switching frequency of the primary switching arrangement (130) and increases the chopping frequency of the boost or buck power converter (100). Moreover this arrangement reduces the voltage slope applied the external magnetic elements (111) compared to the traditional hard switching improving their lifetime and reducing the electromagnetic interference.

By primary dynamical switching loss, we mean a function of the turn-on energy, the turn-off energy and/or the reverse recovery energy of the primary switching unit characterized in a hard-switching mode. In particular, the primary dynamical switching loss may be defined as a sum of the turn-on energy, the turn-off energy and/or the reverse recovery energy of the primary switching unit.

By secondary dynamical switching loss, we mean a function of the turn-on energy, the turn-off energy and/or the reverse recovery energy of the secondary switching unit characterized in a hard-switching mode. In particular, the secondary dynamical switching loss may be defined as a sum of the turn-on energy, the turn-off energy and/or the reverse recovery energy of the secondary switching unit.

The power converter (100) may comprise one or a plurality of the following technical features which may be considered alone or in combination.

According to an embodiment, said resonant unit (150) may comprise at least one inductor (153) and one capacitor (151, 152).

Thus, this arrangement allows adjusting the resonance of the resonant unit (150).

According to an embodiment, said primary switching arrangement (130) may comprise at least a first primary switching unit (131) and a second primary switching unit (135) and/or wherein said secondary switching arrangement (170) may comprise at least a first secondary switching unit (171) and a second secondary switching unit (175).

According to an embodiment, a dimension of primary switching arrangement (130) may be larger than a dimension of the secondary switching arrangement (170). According to an embodiment, the size of primary switching arrangement (130) may be bigger than the size of the secondary switching arrangement (170).

By dimension, we mean a component dimension.

Thus, this arrangement the primary switching arrangement (130) may dissipated more heat than the secondary switching arrangement (170) and the reliability of the primary switching arrangement (130) may be better than the secondary switching.

According to an embodiment, the primary switching arrangement (130) may comprise a primary dynamical switching loss and said secondary switching arrangement (170) may comprise a secondary dynamical switching loss; said primary dynamical switching loss may be higher than said secondary dynamical switching loss.

Thus, this arrangement reduces the audible noise.

According to an embodiment, said at least one primary switching unit (131, 135) may be a Gate Turn-OFF thyristor, Insulated-Gate Bipolar Transistor, Field Effect Transistor and/or Metal-Oxide-Semiconductor Field-Effect Transistor and/or said at least one secondary switching unit (171, 175) may be a Field Effect Transistor and/or a Metal-Oxide-Semiconductor Field-Effect Transistor.

Thus, this arrangement linked of the thermal resistance losses and improves the lifetime, the thermal cycle, the reliability and the size of the power converter (100).

According to an embodiment, the power converter (100) may comprise at least one:

primary terminal (110): said primary terminal (110) may be configured to connect a primary electrical component 901 to said power converter (100);

secondary terminal (190): said secondary terminal (190) may be configured to connect a secondary electrical component 902 to said power converter (100);

common terminal (145): said common terminal (145) may be connected to said primary electrical component 901 to said secondary electrical component 902;

said primary switching arrangement (130) may be connected to said primary terminal (110), to said secondary terminal (190), and to said common terminal (145), and said secondary switching arrangement (170) may be to connected to said secondary terminal (190) and to said common terminal (145).

Thus, this arrangement allows the power converter (100) to be connected a load and an energy source.

According to an embodiment, the primary switching arrangement (130) may comprise at least a first primary switching unit (131) and a second primary switching unit (135) and/or wherein the secondary switching arrangement (170) may comprise at least a first secondary switching unit (171) and a second secondary switching unit (172).

According to an embodiment, the primary switching arrangement (130) may comprise a primary dynamical switching loss and said secondary switching arrangement (170) may comprise a secondary dynamical switching loss; said primary dynamical switching loss may be higher than said secondary dynamical switching loss.

Thus, this arrangement reduces the audible noise.

According to an embodiment, the primary switching frequency may be may comprise between 2 kHz and 60 kHz, in particular between 2.9 kHz and 53 kHz, and preferably between 3.4 kHz and 46 kHz and said secondary switching frequency may be may comprise between 5 kHz and 96 kHz, in particular between 9 kHz and 83 kHz, and preferably between 14 kHz and 71 kHz.

Another aspect of the present invention may provide a boost or buck process (501, 502) for converting a input primary power having a input primary voltage (201) and a input primary current (202) into a output secondary power having a output secondary voltage (203) and output secondary current (204) or a input secondary power having said input secondary voltage (291) and a input secondary current (292) into a output primary power having a output primary voltage (293) and second primary current (294) respectively; said boost or buck process (501, 502) comprising at least a step of:

providing a power converter (100) according to claims 1 to 6;

switching OFF of at least one secondary switching unit (171, 175) when a voltage across said at least one primary switching unit (131, 135) reaches a predetermined ratio of said output secondary voltage (203) or said output primary voltage (293) respectively.

According to an embodiment, said predetermined ratio of said output secondary voltage (203) or said output primary voltage (293) respectively may be may comprise between 20% and 80%, in particular between 40% and 60% and preferably between 45% and 55%.

According to an embodiment, said voltage across said at least one primary switching unit (131, 135) may be a voltage across said at least one capacitor (151, 152).

According to an embodiment, said at least one secondary switching unit (171, 175) may comprise intrinsic characteristic controlling the time of said switching OFF step.

According to an embodiment, said intrinsic characteristic may be a gate resistor of said at least one secondary switching unit (171, 175).

According to an embodiment, said voltage across said at least one primary switching unit (131, 135) reaches a voltage between said secondary terminal (190) and said primary terminal (110).

According to an embodiment, said voltage across said at least one primary switching unit (131, 135) reaches a voltage between said primary terminal (110) and said common terminal (145).

According to an embodiment, a current of said resonant unit (150) reaches a maximum resonant current.

According to an embodiment, the boost or buck process (501, 502) may comprise a switch ON step of said at least one primary switching unit (131, 135) when said voltage across said at least one primary switching unit (131, 135) reaches a minimum voltage.

According to an embodiment, the boost or buck process (501, 502) may comprise a step:
- a direct first primary current 233 (IDH) flows through the first primary switching unit from the primary terminal to the secondary terminal and reaches a minimum first primary current;
- a direct second resonant voltage (VCL) measured between the primary terminal and the common terminal drops;
- a direct resonant current 251 (ILR) flows from the primary terminal to the common terminal through the resonant unit and reaches a maximum direct resonant current 251; and,
- a reverse second primary current 236 (IQL) flows through the second primary switching unit from the primary terminal to the common terminal and may be different than a reference reverse second primary current 236.

According to an embodiment, the boost or buck process (501, 502) may comprise a step:
- said direct first primary current 233 (IDH) reaches a reference first primary current;
- said direct second resonant voltage (VCL) reaches a reference direct second resonant voltage;
- said direct resonant current 251 (ILR) drops; and,
- said reverse second primary current 236 (IQL) reaches a minimum reverse second primary current 236.

According to an embodiment, the boost or buck process (501, 502) may comprise a step:
- said direct first primary current 233 (IDH) stays at said reference first primary current;
- said direct second resonant voltage (VCL) stays at said reference direct second resonant voltage;
- said direct resonant current 251 (ILR) reaches a reference direct resonant current 251; and,
- said reverse second primary current 236 (IQL) reaches a maximum reverse second primary current 236.

According to an embodiment, the boost or buck process (501, 502) may comprise a step:
- said direct first primary current 233 (IDH) stays at said reference first primary current;
- said direct second resonant voltage (VCL) increases;
- said direct resonant current 251 (ILR) stays at said reference direct resonant current 251; and,
- said reverse second primary current 236 (IQL) drops.

According to an embodiment, the boost or buck process (501, 502) may comprise a step:
- said direct first primary current 233 (IDH) reaches a maximum first primary current;
- said direct second resonant voltage (VCL) reaches a maximum direct second resonant voltage;
- said direct resonant current 251 (ILR) flows from the primary terminal to the secondary terminal through the resonant unit; and,
- said reverse second primary current 236 (IQL) reaches said reference reverse second primary current 236;

According to an embodiment, the boost or buck process (501, 502) may comprise a step:
- said direct first primary current 233 (IDH) stays at said maximum first primary current;
- said direct second resonant voltage (VCL) stays at said maximum direct second resonant voltage;
- said direct resonant current 251 (ILR) flows from the primary terminal to the secondary terminal through the resonant unit; and,
- said reverse second primary current 236 (IQL) stays at said reference reverse second primary current 236;

According to an embodiment, the boost or buck process (501, 502) may comprise a step:
- said direct first primary current 233 (IDH) stays at said maximum first primary current;
- said direct second resonant voltage (VCL) stays at said maximum direct second resonant voltage;
- said direct resonant current 251 (ILR) flows from the primary terminal to the secondary terminal through the resonant unit; and,
- said reverse second primary current 236 (IQL) stays at said reference reverse second primary current 236;

According to an embodiment, the boost or buck process (501, 502) may comprise a step:
- said direct first primary current 233 (IDH) stays at said maximum first primary current;
- said direct second resonant voltage (VCL) stays at said maximum direct second resonant voltage;
- said direct resonant current 251 (ILR) flows from the primary terminal to the secondary terminal through the resonant unit; and,
- said reverse second primary current 236 (IQL) stays at said reference reverse second primary current 236.

According to an embodiment, the boost or buck process (501, 502) may comprise a step:
- a direct second primary current 237 (IDL) flows through the second primary switching unit from the common terminal to the primary terminal and reaches a minimum second primary current;
- a direct first resonant voltage (VCH) measured between the primary terminal and the secondary terminal drops;
- a second resonant current (ILR) flows from the secondary terminal to the primary terminal through the resonant unit and reaches a maximum direct resonant current 251; and,
- a reverse first primary current (IQH) flows through the first primary switching unit from the secondary terminal to the primary terminal and may be different than a reference reverse first primary current;

According to an embodiment, the boost or buck process (501, 502) may comprise a step:
- said direct second primary current 237 (IDL) reaches a reference first secondary current;
- said direct first resonant voltage (VCH) reaches a reference direct first resonant voltage;
- said second resonant current (ILR) drops; and,
- said reverse first primary current (IQH) reaches a minimum reverse first primary current;

According to an embodiment, the boost or buck process (501, 502) may comprise a step:

said direct second primary current 237 (IDL) stays at said reference first secondary current;
said direct first resonant voltage (VCH) stays at said reference direct first resonant voltage;
said second resonant current (ILR) reaches a reference second resonant current; and,
said reverse first primary current (IQH) reaches a maximum reverse first primary current;

According to an embodiment, the boost or buck process (501, 502) may comprise a step:
said direct second primary current 237 (IDL) stays at said reference first secondary current;
said direct first resonant voltage (VCH) increases;
said second resonant current (ILR) reaches a reference second resonant current; and,
said reverse first primary current (IQH) drops;

According to an embodiment, the boost or buck process (501, 502) may comprise a step:
said direct second primary current 237 (IDL) reaches a maximum direct first secondary current;
said direct first resonant voltage (VCH) reaches a maximum direct first resonant voltage;
said second resonant current (ILR) flows from the secondary terminal to the primary terminal through the resonant unit; and,
said reverse first primary current (IQH) reaches said reference reverse first primary current;

According to an embodiment, the boost or buck process (501, 502) may comprise a step:
said direct second primary current 237 (IDL) stays at said maximum direct first secondary current;
said direct first resonant voltage (VCH)) stays at said maximum direct first resonant voltage;
said second resonant current (ILR) flows from the secondary terminal to the primary terminal through the resonant unit; and,
said reverse first primary current (IQH) stays at said reference reverse first primary current;

According to an embodiment, the boost or buck process (501, 502) may comprise a step:
said direct second primary current 237 (IDL) stays at said maximum direct first secondary current;
said direct first resonant voltage (VCH)) stays at said maximum direct first resonant voltage;
said second resonant current (ILR) flows from the secondary terminal to the primary terminal through the resonant unit; and,
said reverse first primary current (IQH) stays at said reference reverse first primary current;

According to an embodiment, the boost or buck process (501, 502) may comprise a step:
said direct second primary current 237 (IDL) stays at said maximum direct first secondary current;
said direct first resonant voltage (VCH)) stays at said maximum direct first resonant voltage;
said second resonant current (ILR) flows from the secondary terminal to the primary terminal through the resonant unit; and,
said reverse first primary current (IQH) stays at said reference reverse first primary current.

BRIEF DESCRIPTION OF THE DRAWINGS

The foregoing and other purposes, features, aspects, and advantages of the invention will become apparent from the following detailed description of embodiments, given by way of illustration and not limitation with reference to the accompanying drawings, in which.

DESCRIPTION OF THE INVENTION

Figure 1:
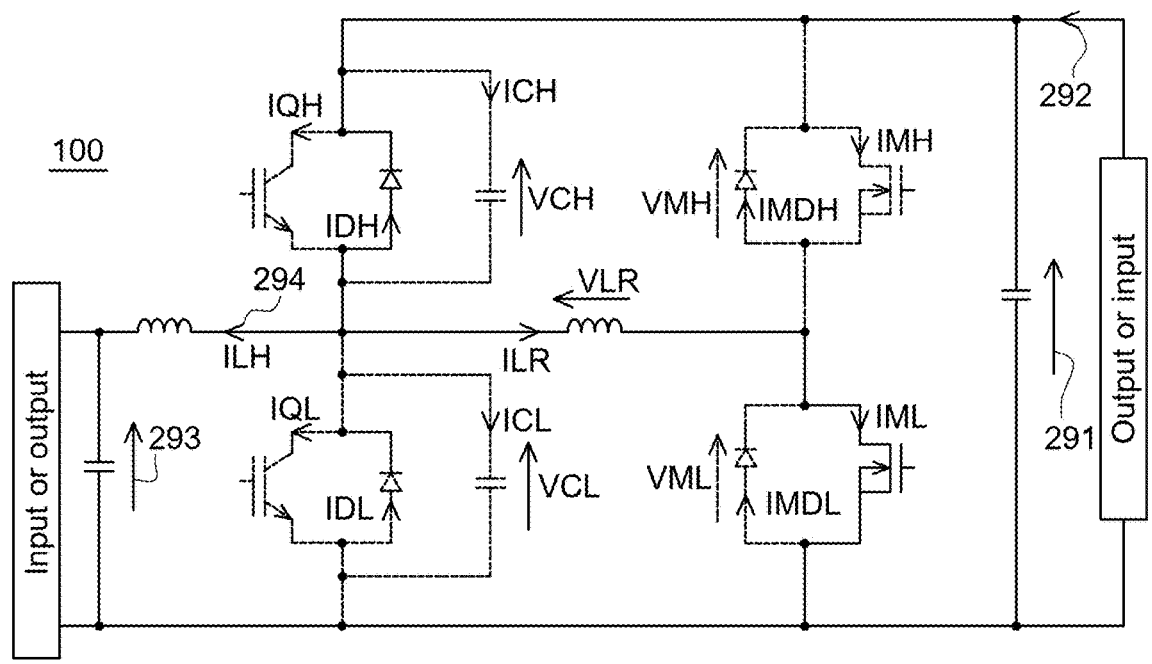
FIG. 1 represents buck power converter according to an embodiment of the present invention.

The present invention may provide a power converter 100 with an improved lifetime, and reliability while reducing the size and the audible noise. The power converter 100 of the present invention, as depicted on FIGS. 1 and 2, may be deemed to improve the lifetime of Energy Storage Systems, ESS for short, also known as Energy Storage Elements, ESE for short, by minimizing current flowing through them. The power converter 100 described in this present application may be dedicated to energy storage systems having a high nominal voltage, which may mean comprised between 750 VDC and 950 VDC. In particular, the present invention may provide a bi-directional power converter 100 since the power converter 100 may function as a boost converter 100 or a buck converter 100.

This power converter 100 may include at least one primary switching arrangement 130, secondary switching arrangement 170 and a resonant unit 150 connecting the primary switching arrangement 130 and the secondary switching arrangement 170.

The primary switching arrangement 130 may comprise at least one primary switching unit 131, 135 having a primary switching frequency. In the present embodiment, the primary switching arrangement 130 may comprise at least a first primary switching unit 131 including a first primary transistor 132 and a first primary diode 133 and a second primary switching unit 135 including a second primary transistor 136 and a second primary diode 137. The first and second primary transistors 131, 136 may be a Gate Turn-OFF thyristor, Field Effect Transistor, Metal-Oxide-Semiconductor Field-Effect Transistor and/or an Insulated-Gate Bipolar Transistor, IGBT for short.

The secondary switching arrangement 170 may comprise at least one secondary switching unit 171, 175 having a secondary switching frequency. In the present embodiment, the secondary switching arrangement 170 may comprise at least a first secondary switching unit 171 including a first secondary transistor 172 and a first secondary diode 173 and a second secondary switching unit 175 including a second secondary transistor 176 and a second secondary diode 177. The first and second secondary transistors 172, 176 may be a Field Effect Transistor and/or a Metal-Oxide-Semiconductor Field-Effect Transistor, MOSFET for short. MOSFET and in particular the Silicon Carbide Metal-Oxide-Semiconductor Field-Effect Transistor, SiC MOSFET for short, may have been selected to avoid the recovery charges and the tail currents met with Silicon transistor like Silicon IGBT. This selection of SiC MOSFET may optimize the benefits of a soft switching process.

Another way to distinguish the primary switching arrangement 130 and secondary switching arrangement 170 may be the size or dimension of the component, since the dimension of the primary switching arrangement 130 may be larger than the size of the secondary switching arrangement 170. A larger dimension of the primary switching arrangement 130 improves the heat dissipation and reliability of the primary switching arrangement 130 since reliability may be linked with the thermal capacity of the primary switching arrangement 130.

The primary switching unit 130 may comprise a primary dynamical switching loss and said secondary switching unit 170 may comprise a secondary dynamical switching loss.

The primary dynamical switching loss may be defined as a function of the turn-on energy, the turn-off energy, and/or the reverse recovery energy of the primary switching unit. In particular, the primary dynamical switching loss may be defined as a sum of the turn-on energy, the turn-off energy, and/or the reverse recovery energy of the primary switching unit.

The turn-on energy, the turn-off energy, and/or the reverse recovery energy may be characterized in hard-switching mode.

The primary switching unit 130 differs from said secondary switching unit 170 in that a small direct drop voltage when high current flows through it, e.g. 1.5V for 110 A, but it has high dynamical switching power losses during the turn ON $E_{ON1}$ and during the turn OFF $E_{OFF1}$, and the turn OFF $E_{RR1}$ of the diode function.

The primary switching unit 130 differs also from said secondary switching unit 170 in that a surface area of semiconductor material of the primary switching unit 130 is greater said secondary switching unit 170, and the cost in square millimeter of the primary switching unit 130, ca. 0.06 €/mm², is lower than the cost in square millimeter of the secondary switching unit 170, ca. 1.8 €/mm².

The turn ON $E_{ON1}$ is characterized by the product of electrical current/voltage quantities at the turn ON, for a hard switching, of the primary switching unit 130.

The turn OFF $E_{OFF1}$ is characterized by the product of the current/voltage electrical quantities at the turn OFF, for a hard switching, of the primary switching unit 130.

The turn OFF $E_{RR1}$ of the diode function is characterized by the product of the current/voltage electrical quantities at the turn OFF, for a hard switching, of the primary switching unit 130.

The turn-on energy may be comprised 15 mJ and 153 mJ. The turn-off energy may be comprised 17 mJ and at least 193 mJ. The recovery reverse energy may be comprised 16 mJ and 163 mJ.

For example, for high power applications, the primary switching unit 130, slow during the dynamical switching, will be a 1.2 kV IGBT or a 1.7 KV IGBT. In this application, the dynamical switching energies the turn ON $E_{ON1}$ are equal to 22 mJ for the 1.2 kV IGBT and 53 mJ for the 1.7 kV IGBT. The turn OFF $E_{OFF1}$ dynamical switching energies are equal to 27 mJ for the 1.2 kV IGBT and 58 mJ for the 1.7 kV IGBT. Finally, the dynamical switching energies of the turn OFF $E_{RR1}$ of the diode function are equal to 28 mJ for the 1.2 kV IGBT and 55 mJ for the 1.7 kV IGBT.

The surface area of the primary switching unit 130 is typically close to 450 mm² for a direct current of 110 A and its cost is equal to 0.06 €/mm².

The secondary switching unit 170 is distinguished from the primary switching unit 130 by a high direct drop voltage when high current flows through it, e.g. 5V for 110 A, but it has, intrinsically, low power dynamical switching losses during the turn ON $E_{ON2}$ and during the turn OFF $E_{OFF2}$ and the turn OFF $E_{RR2}$ of the diode function of the secondary switching unit 170.

For example, for high power applications, the dynamical fast switching behavior of the secondary switching unit 170 is either a SiC 1.2 kV MOSFET or a 1.7 KV SiC MOSFET. In this application the dynamical switching energies of the turn ON $E_{ON2}$ are equal to 3.3 mJ for the SiC 1.2 kV MOSFET and 6 mJ for the 1.7 kV SiC MOSFET. The dynamical switching energies of the turn OFF $E_{OFF2}$ are equal to 1.8 mJ for the SiC 1.2 kV MOSFET and 3 mJ for the 1.7 kV SiC MOSFET. Finally, the dynamical switching energies of the turn OFF $E_{RR2}$ of the diode function of the secondary switching unit 170 are equal to 180 μJ for the MOSFET 1.2 kV and 240 μJ for the MOSFET 1.7 kV.

The surface area of the semiconductor of the secondary switching unit 170 is close to 36 mm² for a current switched close to 110 A and its cost is typically equal to 1.8 €/mm².

The primary switching frequency of the primary switching unit may be a function of said primary switching loss. This primary dynamical switching frequency may be may comprise between 2 kHz and 60 kHz, in particular between 2.9 kHz and 53 kHz, and preferably between 3.4 kHz and 46 kHz.

On other side, the secondary dynamical switching loss may be defined as a function of the turn-on energy, the turn-off energy, and/or the reverse recovery energy of the secondary switching unit. In particular, the secondary dynamical switching loss may be defined as a sum of the turn-on energy, the turn-off energy, and/or the reverse recovery energy of the secondary switching unit. The turn-on energy, the turn-off energy, and/or the reverse recovery energy may be characterized in hard-switching mode.

The turn-on energy may be comprised between 0 and 100 mJ. The turn-off energy may be comprised between 100 μJ and at least 1 mJ. The recovery reverse energy may be comprised between zero and 1 mJ.

The secondary switching frequency of the secondary switching unit may be a function of said secondary switching loss. This secondary dynamical switching frequency may be comprised between 5 kHz and 96 kHz, in particular between 9 kHz and 83 kHz, and preferably between 14 kHz and 71 kHz.

As it may be understood, the primary switching frequency may be lower than the secondary switching frequency.

When the primary switching arrangement 130 may comprise more than one switching unit, the primary dynamical switching loss of the primary switching arrangement 130 may be linked with the first primary switching frequency of the first primary switching unit 131, in particular of the first primary transistor 132, and the second primary switching frequency of the second primary switching unit 135, in particular of the second primary transistor 136.

When the secondary switching arrangement 170 may comprise more than one switching unit, the secondary dynamical switching loss of the secondary switching arrangement 170 may be linked with the first secondary switching frequency of the first secondary switching unit 171, in particular of the first secondary transistor 172, and the second secondary switching frequency of the second secondary switching unit 175, in particular of the second secondary transistor 176.

As pictured in FIG. 1, the power converter 100 may comprise a primary terminal 110, a second terminal 190 and a common terminal 145. The primary terminal 110 may comprise a primary inductor 111 and/or a primary capacitor 112, and the secondary terminal 190 may comprise a secondary capacitor 191.

The primary terminal 110 may be configured to connect a primary electrical component 901, having input primary voltage of $V_{201}$ or output primary voltage of $V_{293}$, which may be a load and/or an energy source, to the power converter 100, the secondary terminal 190 may be configured to connect a secondary electrical component 902, having output secondary voltage of $V_{203}$ or input secondary voltage of $V_{291}$, which may be a load and/or an energy source, to the power converter 100 and the common terminal 145 may be connected to the primary electrical component 901 and to the secondary electrical component 902.

On FIG. 1, the primary switching arrangement 130 may be connected to the primary terminal 110, to the secondary terminal 190, and to the common terminal 145. As previously mentioned, the primary switching arrangement 130 may comprise the first primary switching unit 131 connecting the primary terminal 110 and the secondary terminal 190, and the second primary switching unit 135 connecting the primary terminal 110 and the common terminal 145. In particular, the first primary switching unit 131 may connect the primary terminal 110 and the secondary terminal 190 via the first primary transistor 132 and/or the first primary diode 133, and the second primary switching unit 135 connecting the primary terminal 110 and the common terminal 145 via the second primary transistor 136 and/or the second primary diode 137.

The secondary switching arrangement 170 may be connected to the secondary terminal 190 and to the common terminal 145. The secondary switching arrangement 170 may comprise the first secondary switching unit 171 connecting the secondary terminal 190 and the resonant unit 150, and the second secondary switching unit 175 connecting the resonant unit 150 and the common terminal 145. In particular, the first secondary switching unit 171 may connect the secondary terminal 190 and the resonant unit 150 via the first secondary transistor 172 and/or the first secondary diode 173, and the second secondary switching unit 175 connecting the resonant unit 150 and the common terminal 145 via the second secondary transistor 176 and/or the second secondary diode 177.

The resonant unit 150, mentioned above, may be connected to the primary terminal 110, to the secondary terminal 190, and to the common terminal 145. The resonant unit 150 may comprise a first capacitor 151 connecting the primary terminal 110 and the secondary terminal 190, and a second capacitor 152 connecting the primary terminal 110 and the common terminal 145. An inductor 153 of the resonant unit 150 may connect the primary terminal 110 and the first and second secondary transistors 172, 176 and/or the first and second secondary diodes 173, 177.

In some embodiment, the resonant unit 150 may comprise at least one inductor 153 connecting the primary terminal 110 and the first and second secondary transistors 172, 176 and/or the first and second secondary diodes 173, 177 and one capacitor 151, 152 connecting the primary terminal 110 and the secondary terminal 190 or the primary terminal 110 and the common terminal 145.

The boost or buck process may have been calculated to reduce the number of first and second secondary switching units 171, 175 chips and to decrease the thermal cycling stress.

Inductor 153 has been chosen to control the time rate of change of intensity (di/dt) at each commutation around 50 A/μs 20 μH, reducing drastically the power losses due to recovery charge of the first secondary diode 173 and second secondary diode 177 embedded inside the secondary switching arrangement 170.

The boost or buck process may have been calculated in order to turns ON at zero voltage and it turns OFF under zero voltage the primary switching arrangement 130.

First and second Capacitors 151, 152 may reduce the tail power losses and fix time rate of change of potential across the primary and secondary electrical components 901, 902 around 1 kV/μs. The time rate of change of potential of the primary switching arrangement 130 may be 20 times lower than the secondary switching arrangement 170 working in hard switching, reducing the electromagnetic interference effects, EMI for short.

Description of a Boost Process

The power converter, according the present invention, may be a bidirectional power converter 100, also called bidirectional power cell. It may work like Boost or Buck. The power converter 100 may be used for the power inverters or for the battery charger dedicated to the traction system for instance.

The description below shows the sequence when the power converter 100 works like a boost power converter 100 and implementing a boost process, which may mean that an energy source 901 may be connected to the primary terminal 110 and the common terminal 145 and a load 902 may be connected to the secondary terminal 190 and the common terminal 145. For reading convenience and better understanding, the switching and resonant units 130, 150, 190, which may be OFF, may be dotted and others, which may be ON, may be draw with solid line.

In the present invention, by "OFF" and "no current" we mean that almost no current may flow, a current lower or equal than 1 mA or the flowing current may be not intended. On other side, by "ON" we mean that a current may flow, a current higher than 1 mA or the flowing current may be intended.

Also, the terms direct and reverse may be just used for reading convenience and may indicate upward and downward respectively and right and left respectively in the direction of the figure.

Further, by the terms "load", we mean all electronic/electrical devices which may transform or consume electrical energy like a motor, a battery, a supercapacitor or a resistor, but not limited thereto, and by "source" we mean all energy suppliers which may supply electrical energy like a motor, a battery, or a supercapacitor for instance, but not limited thereto.

During an initial step, an input primary current 202 flows through the primary inductor 111, having an inductance $L_{111}$, and the primary switching arrangement 130 from the energy source to the secondary terminal 190. In particular, the input primary current 202 flows to the secondary terminal 190 through the primary inductor 111 and at least one of a primary switching unit comprised in the primary switching arrangement 130 and preferably in the first primary switching unit 131. No current flows in the others units, which mean no current flows through a second primary switching unit 135 may comprise the primary switching unit, the resonant unit 150 and the secondary switching arrangement 170.

Figure 3:
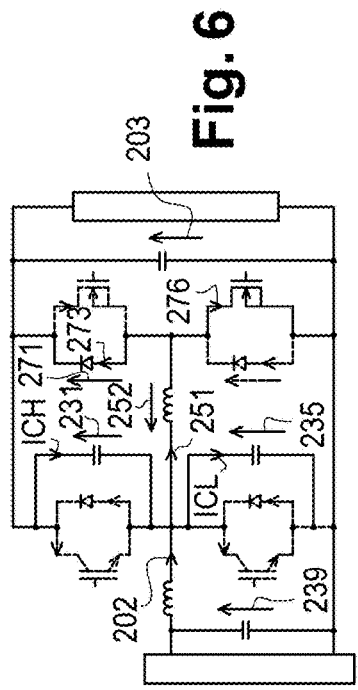
FIGS. 3 to 17 illustrate the sequences of the boost process according to the same or another embodiment of the present invention.

As depicted in FIG. 3, a direct second primary current 233 flows through the second primary diode 133 of the second primary switching unit 131 from the common terminal 145 to the primary terminal 110.

Figure 4:
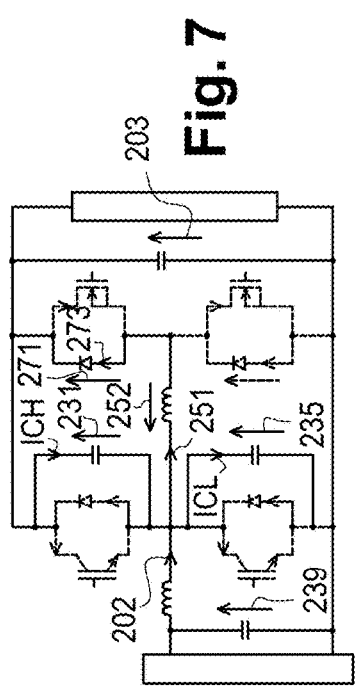

After this initial step, a first boost step occurs wherein the secondary switching arrangement 170 may be switched ON, in particular the second secondary switching unit 175 and preferably in the second secondary transistor 176, which allows the input primary current 202 to flow through the resonant unit 150 as direct resonant current 251 and through the second secondary switching unit 175 as reverse second secondary current 276 as depicted in FIG. 4. This first boost step may comprise a first rising edge when the second secondary transistor 176 may be switched ON and a first falling edge when the second secondary transistor 176 may be switched OFF. At the same time, as it can be observed on FIG. 33, the direct first primary current 233 decreases and reaches a minimum first primary current, which may be below a first primary reference current. Typically, the first primary reference current may be almost zero A.

As the first primary diode 133 turns OFF, the direct first primary current 233 decreases slowly, which may mean with the time rate of change of intensity di/dt, of the direct first primary current 233, the reverse recovery energy, $E_{RR}$ for short, may be drastically reduced.

This linearly increase of the reverse second secondary current 276 and the direct resonant current 251 may be due to the input primary current 202, which may be considered as a constant during the first boost step as shown the equation below:

$$I_{FRC}(t) = \frac{V_{203} * t}{L_{153}}$$

$$I_{DFPC}(t) \cong I_{202[t_0]} - \frac{V_{203} * t}{L_{153}}$$

$$V_{DSPV} \cong V_{203}$$

Figure 33:
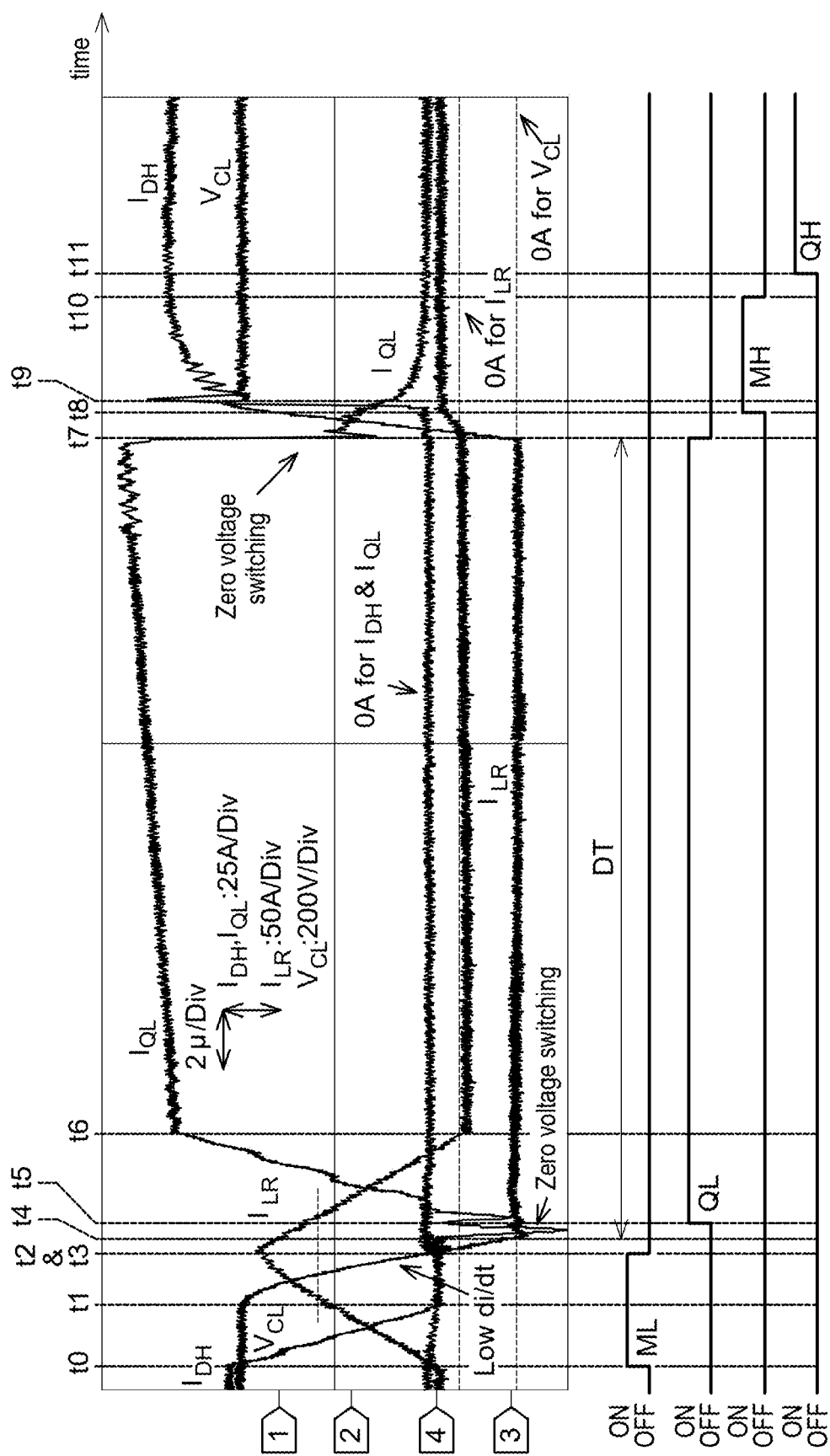
FIG. 33 represents a control sequences; and,
FIG. 34 illustrates the temperature difference versus the number of transistors connected in parallel.

As it can be observed on FIG. 33, the second secondary switching unit 175, and in particular second secondary transistor 176, turns ON at the zero current and it discharges only its own intrinsic capacitor.

The direct first primary voltage 231 across the resonant unit 150, in particular across the first capacitor 151, decreases due to a resonance phase. The time rate of change of potential dv/dt across the inductor 153, having an inductance $L_{153}$ may be fixed by the natural frequency of the resonant unit 150 $\omega_0$, and in particular of the inductor 153 and the first and second capacitors 151, 152, having a capacitance $C_{151}$ and $C_{152}$ respectively. The natural frequency $\omega_0$ may be given by:

$$\omega_0 = \frac{1}{\sqrt{L_{153} * (C_{151} + C_{152})}}$$

with $V_{152}(t) = V_{203} * \cos(\omega_0 t)$ and $I_{251}(t) = I_{202[t_0]} + V_{203} * \sqrt{\frac{C_{151} + C_{152}}{L_{252}}} \sin(\omega_0)$ The direct resonant current 251 rises during the first boost step as mentioned before. As soon as the voltage across the second capacitor 152, i.e. the direct second primary voltage 235 measured between the primary terminal 110 and the common terminal 145, reaches a predetermined ratio of output secondary voltage 203, for example the predetermined ratio of said output secondary voltage 203 may comprise between 20% and 80%, in particular between 40% and 60% and preferably between 45% and 55%, the second secondary switching unit 175, in particular the second secondary transistor 176, may be switched off. The duration of $[t_1, t_2]$ may be equal to $$\frac{\pi}{3 * \omega_0}.$$

It may be necessary to precise that a particular effect is achieved at a predetermined ratio of said output secondary voltage 203 equal to 50% more or less 1 percentage point.

When the predetermined ratio of said output secondary voltage 203 may be reached, the second secondary transistor 176 may be switched OFF, the direct resonant current 251, flowing from the primary terminal 110 to the common terminal 145 through the resonant unit 150, reaches a maximum direct resonant current 251 maximum and may be equal at:

$$I_{153[t_2]} = I_{L_{111}[t_0]} + \sqrt{\frac{C_{151} + C_{152}}{L_{153}}} * V_{203} * \frac{\sqrt{3}}{2}$$

Figure 5:
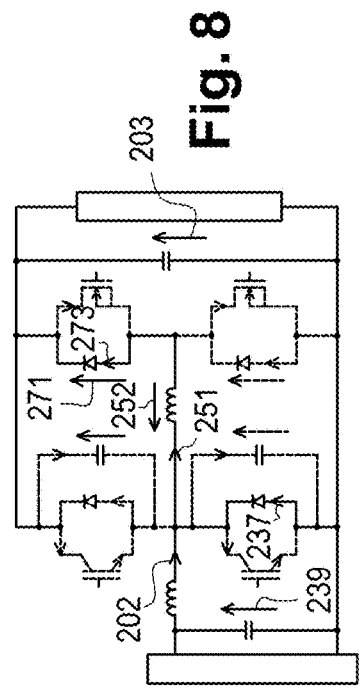
Figure 6:
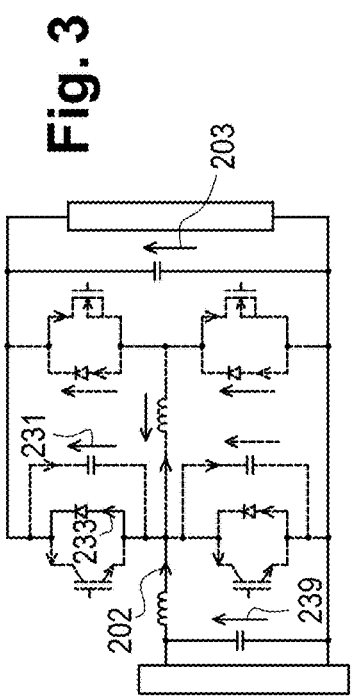

Shortly after, a direct first primary voltage 231 measured between the primary terminal 110 and the secondary terminal 190, in particular across the first capacitor 151 of the resonant unit 150, and a direct second primary voltage 235 measured between the primary terminal 110 and the common terminal 145, in particular across the second capacitor 152 of the resonant unit 150, decrease as illustrated in FIG. 5. These direct first primary voltage 231 and direct second primary voltage 235 decrease or in others words theses first and second capacitors 151, 152 discharge increase linearly a reverse second secondary current 276 flowing through the second secondary transistor 176 and the direct resonant current 251 flowing through the resonant unit 150 and in particular in the inductor 153 until reaching a maximum direct resonant current 251 as on FIGS. 6 and 33.

At first falling edge, the second secondary switching unit 175, in particular the second secondary transistor 176, turns OFF and its time rate of change of potential may be controlled by its intrinsic characteristic, and in particular its gate resistor. In others words, the time rate of change of potential of the second secondary transistor 176 may be adjusted by the gate resistors to reach a predetermined value.

The choice to switch OFF the second secondary switching unit 175, in particular the second secondary transistor 176, at a predetermined ratio of said output secondary voltage 203 on the first falling edge, reduces the resonant current in the resonant unit 150 and the primary and secondary switching arrangements 130, 170. Thus the power losses inside the second secondary switching unit 175, in particular inside the second secondary transistor 176, may be optimized, to minimize their thermal cycling.

Unlike ordinary transistors working in hard switching, the second secondary switching unit 175 of the power converter 100 may not apply a fast time rate of change across the load due to the inductor 153. As soon as, a direct second secondary voltage 275 across the second secondary switching unit 175 reaches the output secondary voltage 203, the first secondary switching unit 171, in particular the first secondary diode 173, turns ON, and the direct resonant current 251 flowing across the inductor begins to decrease as on FIG. 6.

The first falling edge may last around 40 ns in this case and the direct resonant current 251 reaches the maximum direct resonant current 251 as previously mentioned.

The resonance phase, already mentioned, in on going with the initial condition $I_{153[t_2]}$ and $V_{235}=50\%*V_{203}$ where:

$$V_{251}(t) = V_{203}\left(1 - \cos\left(\omega_0 * t - \frac{\pi}{3}\right)\right)$$

and $$I_{251}(t) = I_{202[t_0]} - V_{203} * \sqrt{\frac{C_{151} + C_{152}}{L_{153}}} * \left(\sin\left(\omega_0 * t - \frac{\pi}{3}\right)\right)$$

To resume the first boost step, the direct first primary current 233 flows through the first primary switching unit 131 from the primary terminal 110 to the secondary terminal 190 and reaches a minimum first primary current, the direct second primary voltage 235 measured between the primary terminal 110 and the common terminal 145 drops, the direct resonant current 251 flows from the primary terminal 110 to the common terminal 145 through the resonant unit 150 and reaches a maximum direct resonant current 251, and a reverse second primary current 236 flows through the second primary switching unit 135 from the primary terminal 110 to the common terminal 145 and may be different than a reference reverse second primary current 236.

Figure 7:
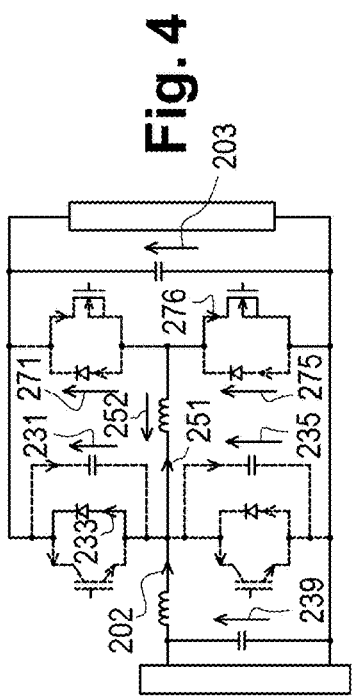
Figure 8:
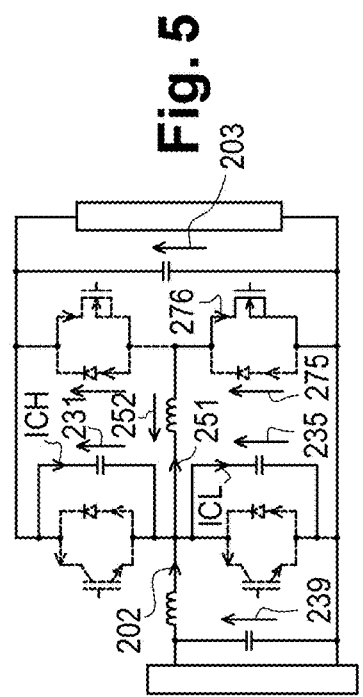

FIG. 7 represents the end of the first boost step and the beginning of a first boost intermediate, where the first and second capacitors 151, 152 may be loaded via the first secondary switching unit 171, in particular via the first secondary diode 173. At this moment, the direct resonant current 251 may be equal to the input primary current 202 of the primary inductor 111 at the first rising edge and the direct second primary voltage 235 across the second capacitor 152 may be equal to zero. The second primary switching unit 135, in particular the second primary diode 137 in the second primary transistor 136 turns ON, as depicted in FIG. 8, with the minimum direct second primary current 237. The duration of this phase [$t_3$, $t_4$] may be equal to $$\frac{\pi}{3*\omega_0},$$

as it can be observed on FIG. 33.

This period between the first boost step and a second rising edge of a second boost step may be called first boost intermediate step. In this first boost intermediate step the direct first primary current 233 reaches a reference first primary current, the direct second resonant voltage reaches a reference direct second resonant voltage, the direct resonant current 251 drops and the reverse second primary current 236 reaches a minimum reverse second primary current 236 as shown on FIG. 33.

Figure 9:
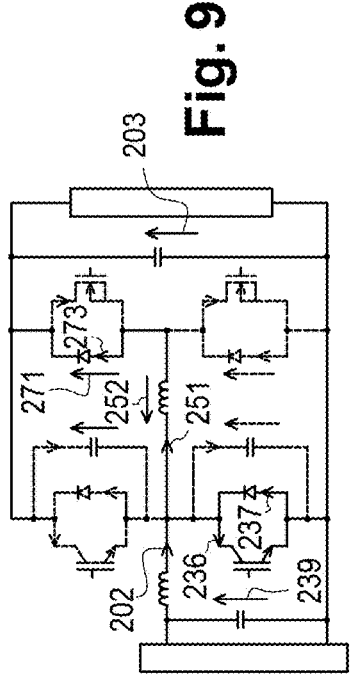

On FIG. 9, the second primary switching unit 135 may be turned ON and the second primary diode 137 and the second primary transistor 136 may conduct at the same time under zero voltage since the threshold voltage of the second primary diode 137 compensates the threshold voltage of the second primary transistor 136. Thus, the turn-on energy loss of the second primary switching unit 135 may be almost nil or negligible.

Always on FIG. 9, the direct resonant current 251 begins to decrease, as shown on FIG. 33, due to the conduction of the first secondary switching unit 171, in particular the first secondary diode 173, and the second primary switching unit 135, in particular the second primary diode 137, and the energy of resonant unit 150, in particular the energy of the inductor 153, may be transferred towards the secondary terminal 190.

Rule below gives the time rate of change of intensity (di/dt) flows through the first secondary diode 173:

$$I_{MDH}(t) = I_{251}(t) \cong I_{202[t_0]} - \frac{V_{203}*t}{L_{153}}$$

As soon as the second primary diode 137 conducts, the second primary transistor 136 may be switched ON and a second boost step begins and may comprise a second rising edge when the second primary transistor 136 may be switched ON and a second falling edge when the second primary transistor 136 may be switched OFF.

Figure 10:
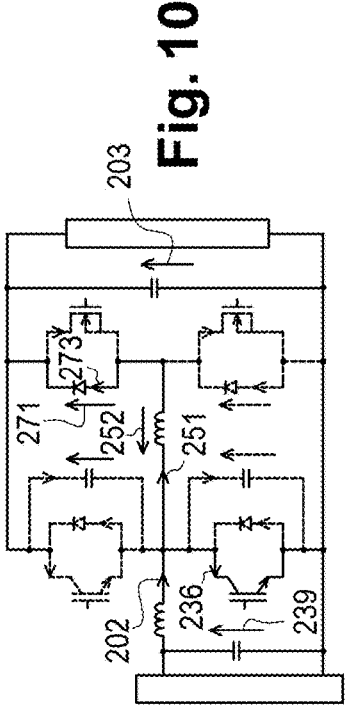

As depicted on FIG. 10, the current crossing the second primary transistor 136, called reverse second primary current 236, grows since the direct resonant current 251 decreases to reach the input primary current value at the first rising edge as shown the rule below:

$$I_{236}(t) = I_{202[t_0]} - I_{251}(t) \cong + \frac{V_{203}*t}{L_{153}}$$

Figure 11:
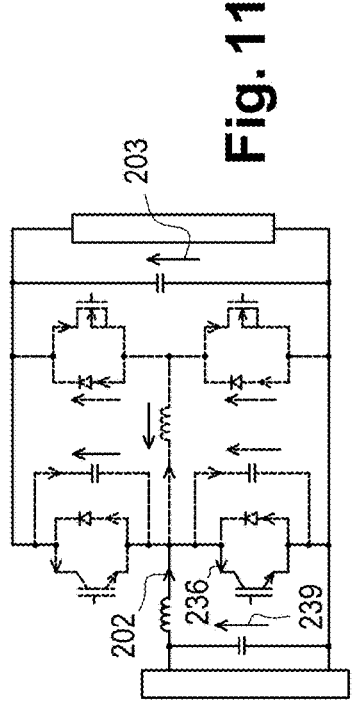
Figure 15:
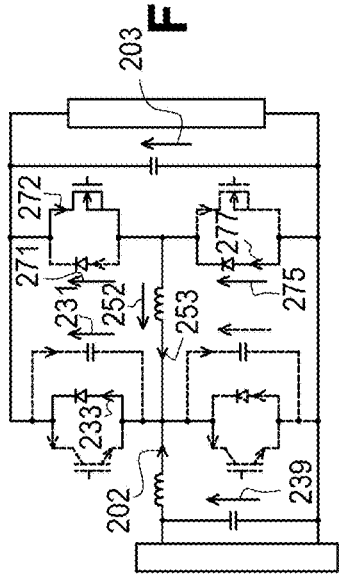

As soon as the reverse second primary current 236 reaches the first primary current value at the first rising edge, the second boost step runs and the second primary transistor 136 time conduction may be given by the control command corresponding to the duty cycle D, around 50%, as illustrated on FIG. 11.

Figure 12:
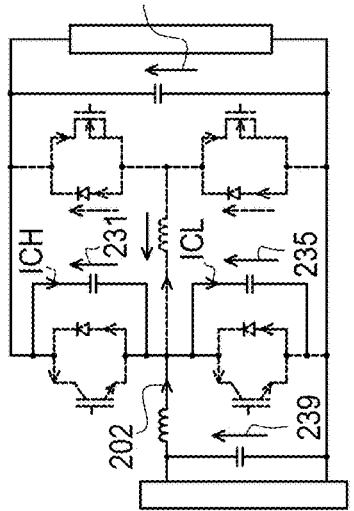

On FIG. 12, the end of the duty cycle D may be represented and the second primary switching unit 135, in particular the second primary transistor 136, may be turned OFF, and the turn-off energy, $E_{OFF}$ for short, loss may be reduced because the current flows through the first and second capacitors 151, 152 as shown on the same figure.

At the end of the second boost step, i.e. at the second falling edge, the second primary transistor 136 turns OFF, the direct second primary current 237 dropping may be a combination between the tail current from a bipolar transistor of the second primary transistor 136 and the first and second capacitors 152:

$$\frac{dv}{dt_{OFF}} = \frac{I_{202[t_0]} - I_{TAIL_{IGBT}}}{C_{151} + C_{152}} * 10^{-6} (V/\mu s)$$

In fact the time rate of change of potential $$\frac{dv}{dt_{OFF}}$$

may be dependent of the primary switching unit technology, in particular of the first primary switching unit 131 and second primary switching unit 135 and their junction temperatures. When the junction temperature growths, the tail current increases. This loss will be described later.

FIG. 33 resumes the second boost step wherein the second primary switching unit 135 may be switched ON and the direct first primary current 233 stays at said reference first primary current, the direct second resonant voltage stays at said reference direct second resonant voltage, the direct resonant current 251 reaches a reference direct resonant current 251 and the reverse second primary current 236 reaches a maximum reverse second primary current 236. The second boost intermediate step may be also resumed and described how the direct first primary current 233 stays at said reference first primary current, the direct second resonant voltage increases, direct resonant current 251 stays at said reference direct resonant current 251 and the reverse second primary current 236 drops.

Figure 13:
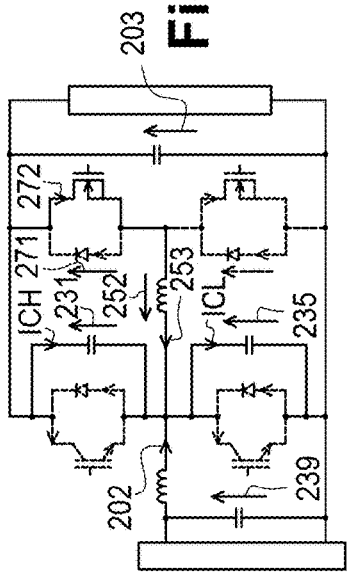
Figure 14:
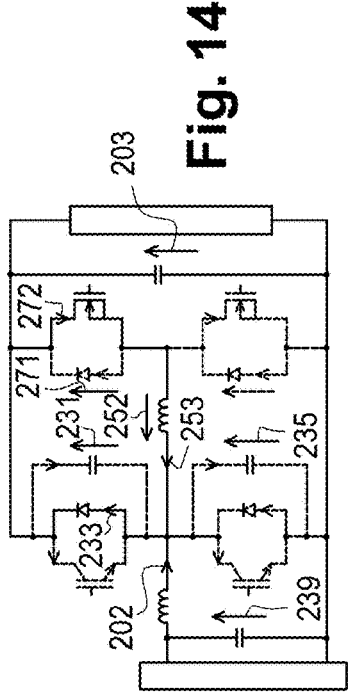

As soon as, the first and second capacitors 151, 152 may be charged by the primary current, FIG. 13, a third boost step starts and the first secondary switching unit 171, in particular the first secondary transistor 172, turns ON: this may be the third rising edge. In the present power converter 100, the conduction of the first secondary switching unit 171, in particular of the first secondary transistor 172, discharges the first and second capacitors 151, 152 and the current flows through the inductor as shown the 13. [t8,t9] duration shows this sequence. Thus the primary switching unit turns ON always at zero voltage.

Shortly after the charge of the first and second capacitor 152, the first primary switching unit 131, in particular the first primary diode 133, conducts as represented on FIG. 13.

Figure 16:
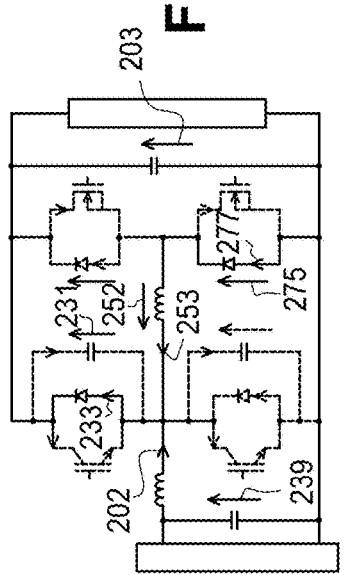

On a third falling edge, the first secondary switching unit 171, in particular the first secondary transistor 172, may be switched OFF and the inductor may be discharged through the first primary switching unit 131, in particular through the first primary diode 133, and the second secondary switching unit 175, in particular through the second secondary diode 177 as depicted on FIG. 16.

In this third boost step, the first secondary switching unit 171 may be switched ON and the direct first primary current 233 reaches a maximum first primary current, the direct second resonant voltage reaches a maximum direct second resonant voltage, the direct resonant current 251 flows from the primary terminal 110 to the secondary terminal 190 through the resonant unit 150 and the reverse second primary current 236 reaches said reference reverse second primary current 236.

Between the third falling edge and a forth rising edge, a third boost intermediate step occurs wherein the direct first primary current 233 stays at said maximum first primary current, the direct second resonant voltage stays at said maximum direct second resonant voltage, the direct resonant current 251 flows from the primary terminal 110 to the secondary terminal 190 through the resonant unit 150 and the reverse second primary current 236 stays at said reference reverse second primary current 236 as shown in FIG. 33.

FIG. 33 shows also a fourth boost step wherein said first primary switching unit 131 may be switched ON and the direct first primary current 233 stays at said maximum first primary current, the direct second resonant voltage stays at said maximum direct second resonant voltage, the direct resonant current 251 flows from the primary terminal 110 to the secondary terminal 190 through the resonant unit 150 and the reverse second primary current 236 stays at said reference reverse second primary current 236.

Figure 17:
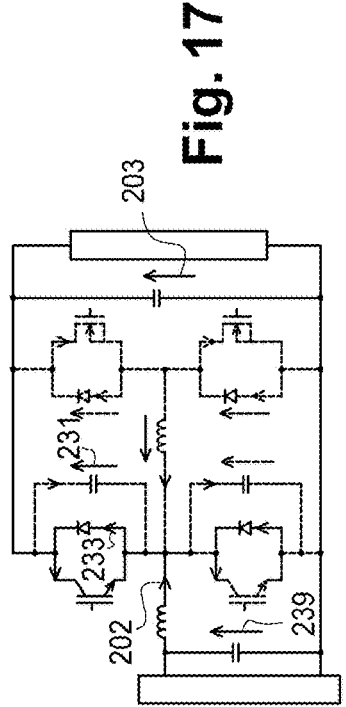

The first primary switching unit 131, in particular the first primary diode 133, conduct during a fourth boost intermediate step wherein the direct first primary current 233 stays at said maximum first primary current, the direct second resonant voltage stays at said maximum direct second resonant voltage, the direct resonant current 251 flows from the primary terminal 110 to the secondary terminal 190 through the resonant unit 150 and the reverse second primary current 236 stays at said reference reverse second primary current 236, as shown on FIG. 17 and the period phase may be completed.

Also, during the first boost step and the third boost step, the power losses may be due to the conduction time of the first secondary switching unit 171 and second secondary switching unit 175, discharge of its intrinsic capacitors and the turn off energy, as shown the equation below:

$$PM_{F_S, P_0, n} = F_S * R_{dson} * n$$

$$* \left[ \int_0^{\frac{P_0 * L_{153}}{V_{203} * V_{201}}} \left( \frac{V_{203} t}{L_{153} n} \right)^2 dt \right.$$

$$+ \int_0^{\frac{\pi}{3\omega_0}} \left( \frac{P_0}{V_{201} * n} + \frac{V_{203}}{n} \sqrt{\frac{C_{151} + C_{152}}{L_{153}}} \sin(\omega_0 t) \right)^2 dt + F_S$$

$$* \int_0^{V_A} Coss_{V_{203}} * V_{203} dV_{203} + F_S$$

$$\left. * E_{OFF} \left( \frac{P_0}{V_{201} n} + \frac{V_{203}}{n} \sqrt{\frac{C_{151} + C_{152}}{L_{153}}} * \frac{\sqrt{3}}{2} \right), R_G \right]$$

Figure 2:
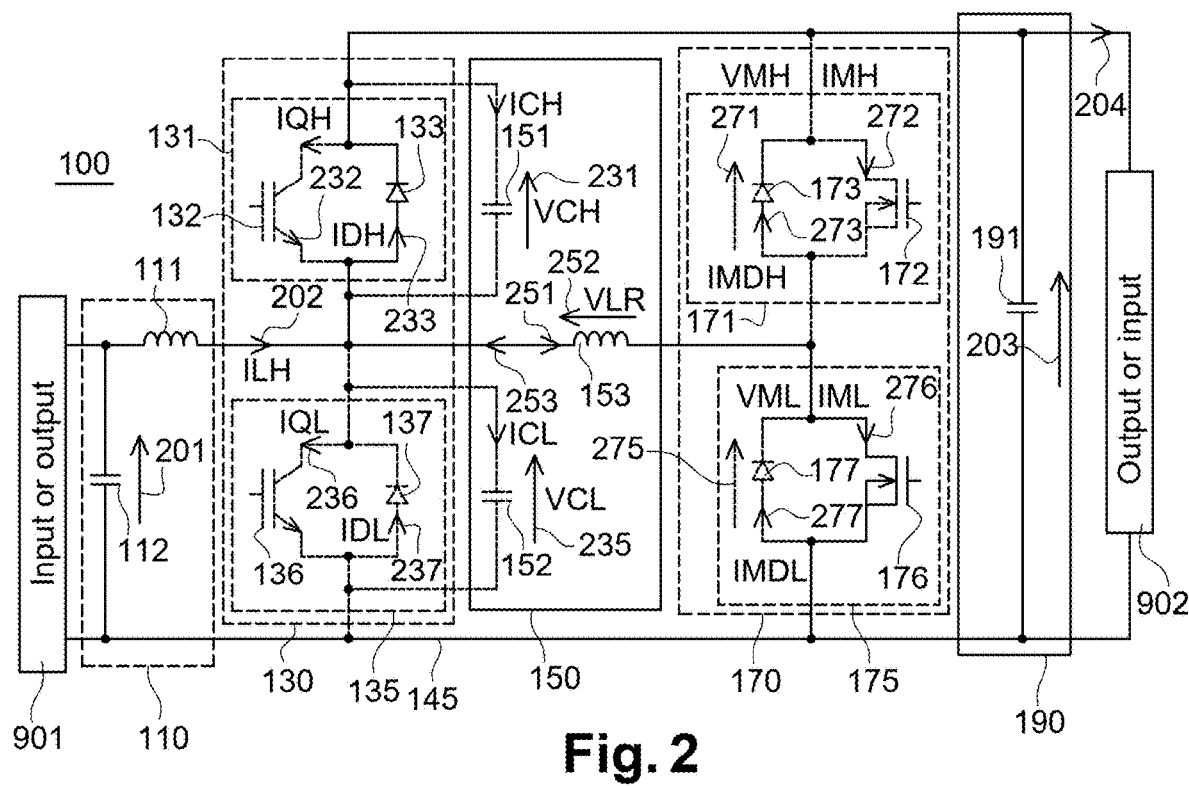
FIG. 2 shows boost power converter according to the same embodiment of the present invention.

According to the control sequences shown by FIG. 33 and according to the resonant circuit 150 by FIG. 2, the dynamical power losses. i.e at the turn ON $E_{ON1}$ of the primary switching unit 130 and the turn OFF $E_{RR1}$ of the diode function, are nil due to the soft switching and the dynamical power losses of the turn OFF $E_{OFF1}$ of the primary switching unit 130 are reduced by a ratio close to two, due to the soft switching. Thus, the power losses in conduction and the reduced dynamical power losses, $E_{ON1} = E_{RR1} = 0$ and $E_{OFF1}/2$ mathematically expressed, involve the possibility to let working the semiconductor switch 130 at a switching frequency well beyond the usual switching frequency which is usually close to 2 or 3 kHz for 1.7 KV IGBTs.

For applications working at 110 A and having a switching frequency of 13 kHz, which means 4.5 times higher than the usual frequency, the joules power losses in the primary switching unit 130, IGBT for example, are equal to 165 W for the static conduction power losses and 377 W for the dynamical switching power losses. Actually, the turn OFF $E_{OFF1}$ of the primary switching unit 130 in this present invention is divided by two compared to $E_{OFF1}$ from the hard switching value.

The dynamical power losses of the turn ON $E_{ON2}$ and the turn OFF $E_{RR2}$ of the diode function of the secondary switching unit 170 are nil because the resonant circuit 150 removes these dynamical power losses leading at the soft switching. The conduction power losses are low because the secondary switching unit 170 is flowing through by a current for a time ratio of the switching period close to 1/50, as shown in FIG. 33 that highlights the current flowing ILR through the inductor 153 that are the same current flowing through the secondary switching unit 170, and in particular are the same current flowing IML through the second secondary transistor 176 during the sequence [t2; t0]. Typically, the conduction losses are close to 6 W for a current of 110 A and the dynamical losses at the turn OFF $E_{OFF2}$ of the secondary switching unit 170 during the hard switching are equal to 51 W.

Therefore, the power joules losses in the primary switching unit 130 are equal to 542 W, either 9.5 times higher than the secondary switching unit 170, which is 57 W.

For comparison, the primary switching unit 130, without the secondary switching unit 170 associated with its resonance circuit 150, would reach a power losses close to 2323 W at 13 kHz which is giving by 165 W of conduction power losses and 2158 W for the dynamical power losses during the commutations, i.e. (58 mJ+53 mJ+55 mJ)×13 kHz. Such a device cannot work because the skilled people in the art know that the junction temperature would be well beyond the limits allowed by IGBTs semiconductor components.

Thus, the present invention, which is characterized by primary dynamical switching losses of the primary switching unit 130 greater than the secondary dynamical switching losses of the secondary switching unit 170, provides the possibility to reduce, on the one hand, the total power losses of the power converter by a ratio equal to four compared to the state of the art and on the other hand, it allows to increase the switching frequency by a ratio equal at four, for the IGBT 1.7 kV.

The realization of the primary switching unit 130 from the material constituting the semiconductor of the secondary switching unit 170 has no economic sense because price of the function of the primary switching unit 130, would be estimated to 810 €, i.e. (450 mm²/36 mm²) 12.5 secondary switching unit 170 at 1.8 €, which is compared to the present invention estimated about 92 €, i.e. 450 mm² of the primary switching unit 130 at 0.06 € and 36 mm² of the secondary switching unit 170 at 1.8 € adds up to 92 €; that is a ratio of eight.

The previously analysis and comparison can be made with the 1.2 kV IGBT, or other kind of components comprised in the primary switching unit 130, having lower conduction power losses than a secondary switching unit 170 and having higher power dynamical power losses than the secondary switching unit 170.

Figure 34:
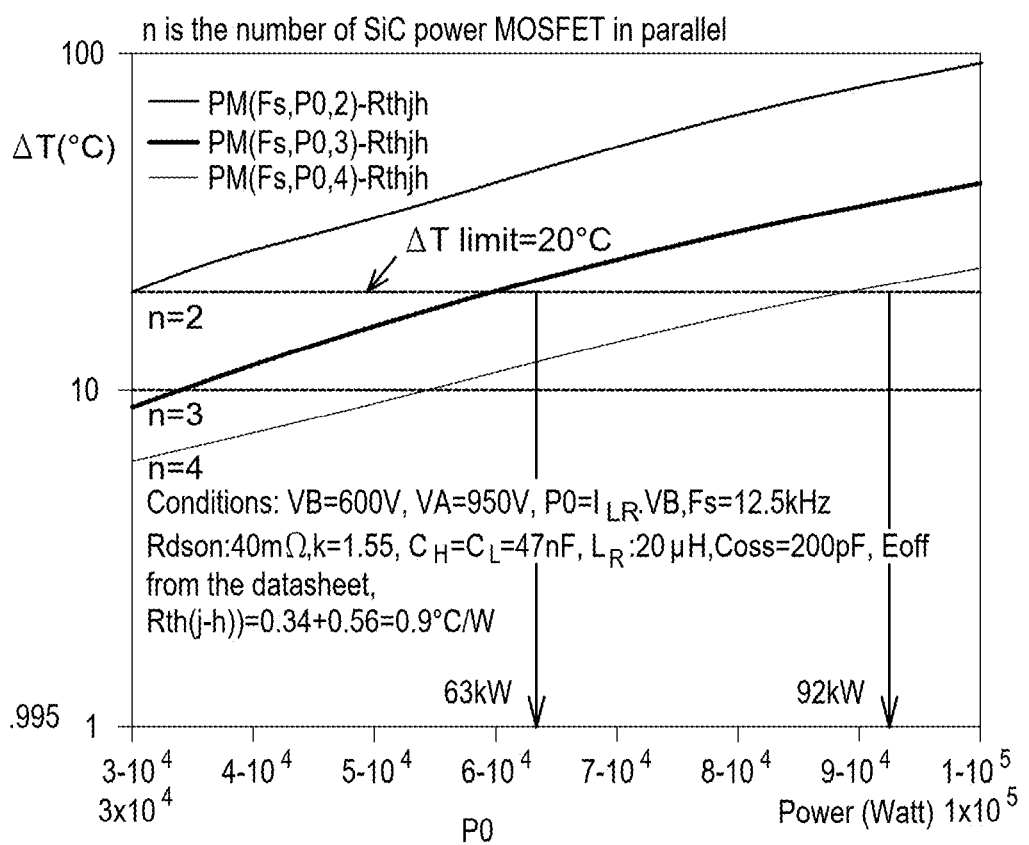

FIG. 34 shows the maximum delta temperature $\Delta T = P_{MOSFET} \times R_{th(j-h)}$) versus the number n of SiC power MOSFET connected in parallel. To avoid aging of first secondary transistor 172 and/or the second secondary transistor 176 due to the thermal cycling, a maximum differential temperature equal to 20° C. may be considered. In this case, TO247 package may be enough to make a power converter 100 with an output power equal to 63 kW.

Although the direct first secondary voltage 271 and direct second secondary voltage 275 may be almost equal to 950V, the first secondary transistor 172 and second secondary transistor 176 may be used due to their high immunity against the cosmic rays.

The zero voltage switching method used in the power converter 100, removes the $E_{ON}$ energy. However, $E_{OFF}$ and $E_{RR}$ contribute to the power losses. $E_{RR}$ of the second primary diode 137 in parallel of the second primary transistors 136, keeps its recovery charges when the second primary transistor 136 may be ON between the second rising edge and the second falling edge. It may be at the second falling edge, when the direct second primary voltage 235 rises, that its charges will be evacuated, involving the power losses in the second primary diode 137.

However, the $E_{RR}$ energy may be low versus the $E_{OFF}$. $E_{OFF}$ corresponds to the recombination of the charge of the bipolar transistor of the first primary transistor 132 and/or the second primary transistor 136. This phenomenon may be known as tail current. FIG. 34 shows the energy sum of $E_{OFF}$ and $E_{RR}$ $E_{total}$ when the first secondary transistor 172 or second primary transistor 136 turns OFF.

As the current may be measured by an external probe of the power converter, tail current may be the summation of the direct second primary current 237 and reverse second primary current 236.

Power converter 100 may be used on all the applications needing high integration, high reliability and high efficiency, with many thermal cycles, in an aggressive market.

Description of a Buck Process

The description hereafter shows the sequences when the power converter 100 works like a Buck power converter 100 and implementing a buck process, which may mean that an energy source may be connected to the secondary terminal 190 and the common terminal 145 and a load may be connected to the primary terminal 110 and the common terminal 145. For reading convenience and better understanding, the switching and resonant unit 150s, which may be OFF, may be dotted and others, which may be ON, may be draw with solid line.

In the present invention, by "OFF" and "no current" we mean that almost no current flows, a current lower or equal than 1 mA or the flowing current may be not intended. On other side, by "ON" we mean that a current flows, a current higher than 1 mA or the flowing current may be intended.

Also, the terms direct and reverse may be just used for reading convenience and may indicate upward and downward respectively or right and left respectively in the direction of the figure.

Further, by the terms "load", we mean all electronic/electrical devices which transform or consume electrical energy like a motor, a battery, a supercapacitor or a resistor, but not limited thereto, and by "source" we mean all energy suppliers which supply electrical energy like a motor, a battery, or a supercapacitor for instance, but not limited thereto.

During an initial step, a direct second primary current 237 flows through the primary inductor 111 and the primary switching arrangement 130 from the energy source to the primary terminal 110. In particular, the second secondary current flows to the secondary terminal 190 through the primary inductor 111 and at least one of a primary switching unit may comprise in the primary switching arrangement 130 and preferably in the second primary switching unit 135. No current flows in the others units, which may mean no current flows through a first primary switching unit 131 may comprise in the primary switching unit, the resonant unit 150 and the secondary switching unit.

Figure 18:
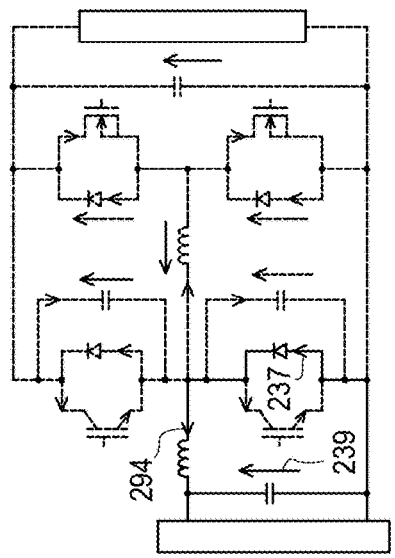
FIGS. 18 to 32 present the sequences of the buck process according to another embodiment of the present invention.

As depicted in FIG. 18), a direct second primary current 237 flows through the second primary diode 137 of the first primary switching unit 131 from the secondary terminal 190 to the primary terminal 110.

Figure 19:
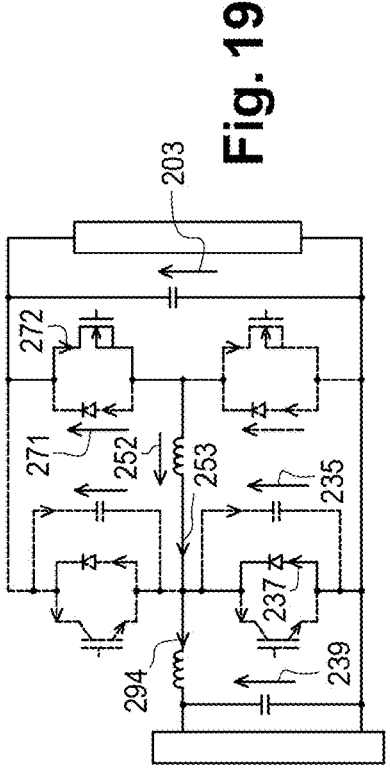

After this initial step, a first buck step occurs wherein the secondary switching unit may be switched ON, in particular the first secondary switching unit 171 and preferably in the first secondary transistor 172, which allows the second secondary current to flow through the resonant unit 150 as reverse direct resonant current 251 and through the first secondary switching unit 171 as reverse first secondary current 272 as depicted in FIG. 19). This first buck step may comprise a first rising edge when the first secondary transistor 172 may be switched ON and a first falling edge when the first secondary transistor 172 may be switched OFF. At the same time, the direct second primary current 237 decreases and reaches a minimum second primary current which may be below a second primary reference current. Typically, the second primary reference current may be almost 0 A.

As the second primary diode 137 turns OFF, the direct second primary current 237 decreases slowly, which may mean with the time rate of change of current di/dt, of the direct second primary current 237, the reverse recovery energy $E_{RR}$ may be drastically reduced.

This linearly increase of the reverse first secondary current 272 and the reverse direct resonant current 251 may be due to the secondary current, which may be considered as a constant during the first buck step. The equation, shown previously, apply also in the buck process, but the difference may be that the $V_{203}$ replace $V_{201}$ and $V_{293}$ replace $V_{291}$.

The first secondary switching unit 171, and in particular first secondary transistor 172, turns ON at the zero current and it discharges only its own intrinsic capacitor.

The reverse first primary voltage 102 across the resonant unit 150, in particular across the first and second capacitor 152s, decreases due to a resonance phase. The time rate of change of potential dv/dt across the inductor may be fixed by the natural frequency of the resonant unit 150 $\omega_0$, and in particular of the inductor and the first and second capacitor 152s.

The reverse direct resonant current 251 rises during the first buck step as mentioned before. As soon as the voltage across the first capacitor 151, i.e. the direct first resonant voltage measured between the primary terminal 110 and the common terminal 145, reaches a predetermined ratio of second primary voltage, for example the predetermined ratio of said second primary voltage may be may comprise between 20% and 80%, in particular between 40% and 60% and preferably between 45% and 55%, the first secondary switching unit 171, in particular the first secondary transistor 172, may be switched off. This duration may be also equal to $$\frac{\pi}{3*\omega_0}.$$

It may be necessary to precise that a particular effect may be achieved at a predetermined ratio of said second primary voltage equal to 50% more or less 1 percentage point.

When the predetermined ratio of said second primary voltage may be reached, the first secondary transistor 172 may be switched OFF, the reverse direct resonant current 251, flowing from the secondary terminal 190 to the common terminal 145 through the resonant unit 150, reaches a direct resonant current 251 maximum.

Figure 20:
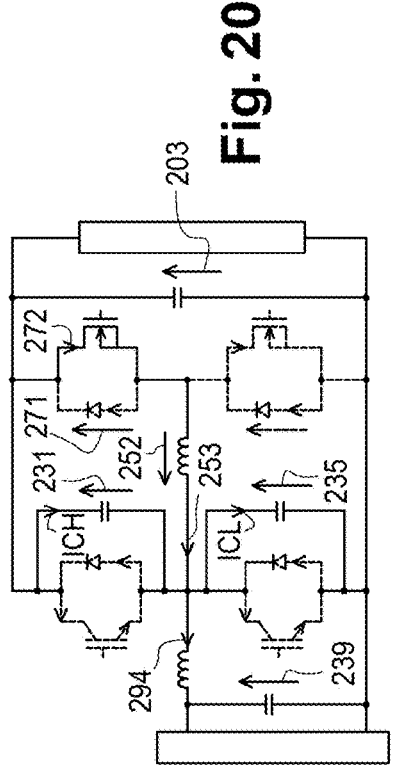
Figure 21:
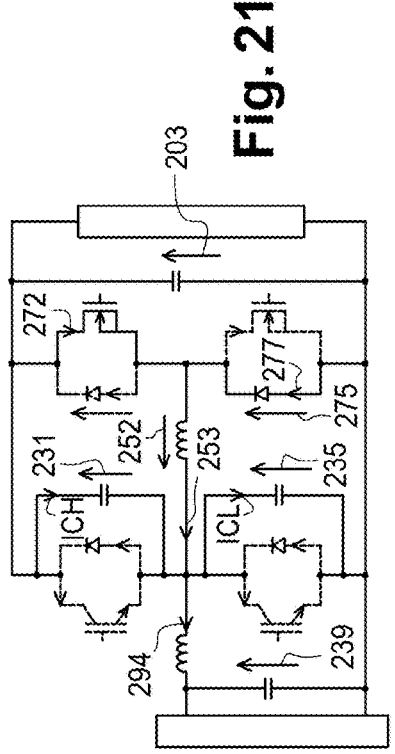

Shorty after, a direct first primary voltage 231 measured between the primary terminal 110 and the secondary terminal 190, in particular across the first capacitor 151 of the resonant unit 150, and a direct second primary voltage 235 measured between the primary terminal 110 and the common terminal 145, in particular across the second capacitor 152 of the resonant unit 150, decrease as illustrated in FIG. 20). These direct first primary voltage 231 and direct second primary voltage 235 decrease or in others words theses first and second capacitor 152s discharge increase linearly a reverse first secondary current 272 flowing through the first secondary transistor 172 and the reverse direct resonant current 251 flowing through the resonant unit 150 and in particular in the inductor until reaching a maximum direct resonant current 251 as on FIG. 21)

At first falling edge, the first secondary switching unit 171, in particular the first secondary transistor 172, turns OFF and its time rate of change of potential may be controlled by its intrinsic characteristic, and in particular its gate resistor. In others words, the time rate of change of potential of the first secondary transistor 172 may be adjusted by the gate resistors to reach a predetermined value.

The choice to switch OFF the first secondary switching unit 171, in particular the first secondary transistor 172, at a predetermined ratio of said output secondary voltage on the first falling edge, reduces the reverse resonant current in the resonant unit 150 and the primary and secondary switching unit. Thus the power losses inside the first secondary switching unit 171, in particular inside the first secondary transistor 172, may be optimized, to minimize their thermal cycling.

Unlike ordinary transistors working in hard switching, the first secondary switching unit 171 of the power converter 100 may not apply a fast time rate of change across the load due to the inductor. As soon as, a direct first secondary voltage 271 across the first secondary switching unit 171 reaches the second primary voltage, the second secondary switching unit 175, in particular the second secondary diode 177, turns ON, and the reverse direct resonant current 251 flowing across the inductor begins to decrease as on FIG. 4).

The first falling edge may last around 40 ns in this case and the second resonant current reaches the maximum second resonant current as previously mentioned.

Figure 22:
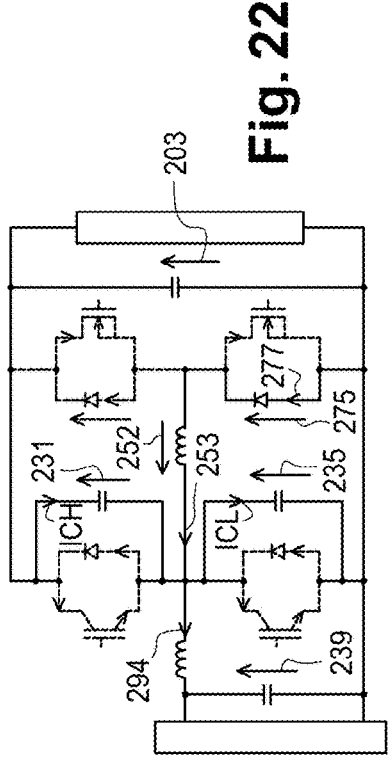
Figure 23:
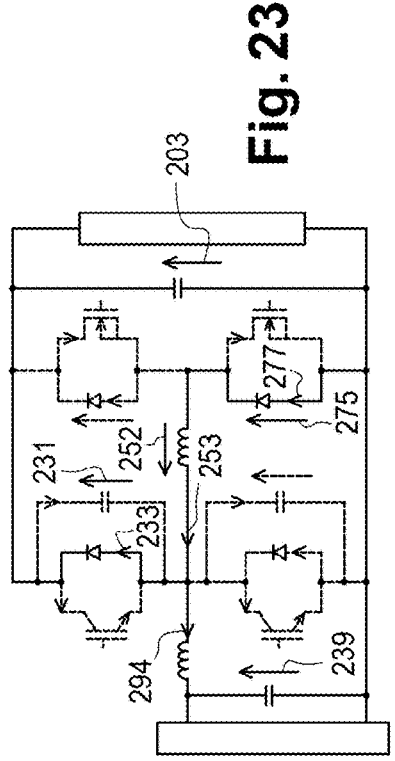

FIG. 22) represents the end of the first buck step and the beginning of a first buck intermediate, where the first and second capacitor 152s may be loaded via the second secondary switching unit 175, in particular via the second secondary diode 177. At this moment, the second resonant current may be equal to the reverse primary current of the primary inductor 111 at the first rising edge and the direct first primary voltage 231 across the first capacitor 151 may be equal to zero. The first primary switching unit 131, in particular the first primary diode 133 in the first primary transistor 132 turns ON, as depicted in FIG. 23), with the minimum direct first primary current 233. The duration of this phase may be also equal to $$\frac{\pi}{3*\omega_0}.$$

Figure 24:
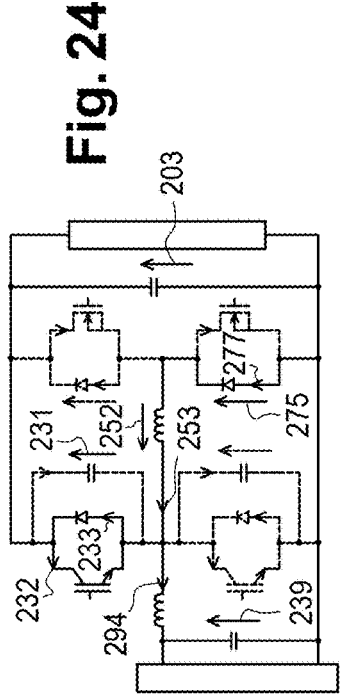

On FIG. 24), the first primary switching unit 131 may be turned ON and the first primary diode 133 and the first primary transistor 132 may conduct at the same time under zero voltage since the threshold voltage of the first primary diode 133 compensates the threshold voltage of the first primary transistor 132. Thus, the turn on energy loss of the first primary switching unit 131 may be almost nil or negligible.

Always on FIG. 24), the first reverse resonant current begins to decrease due to the conduction of the second secondary switching unit 175, in particular the second secondary diode 177, and the first primary switching unit 131, in particular the first primary diode 133, and the energy of resonant unit 150, in particular the energy of the inductor, may be transferred towards the primary terminal 110.

Rule below gives the time rate of change of current di/dt flows through the second secondary diode 177.

As soon as the first primary diode 133 conducts, the first primary transistor 132 may be switched ON and a second boost step begins and may comprise a second rising edge when the first primary transistor 132 may be switched ON and a second falling edge when the first primary transistor 132 may be switched OFF.

Figure 25:
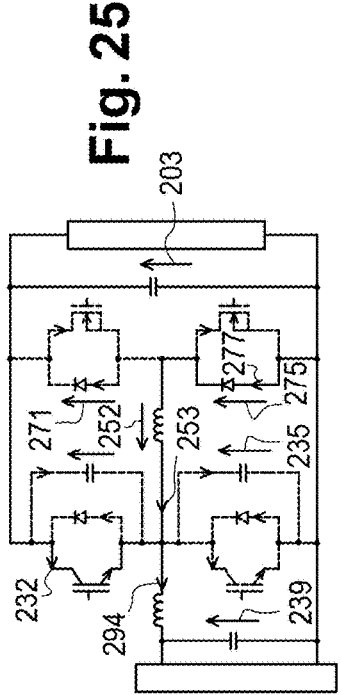

As depicted on FIG. 25), the current crossing the first primary transistor 132, called reverse first primary current, grows since the reverse direct resonant current 251 decreases to reach the second secondary current value at the first rising edge as shown the rule below.

Figure 26:
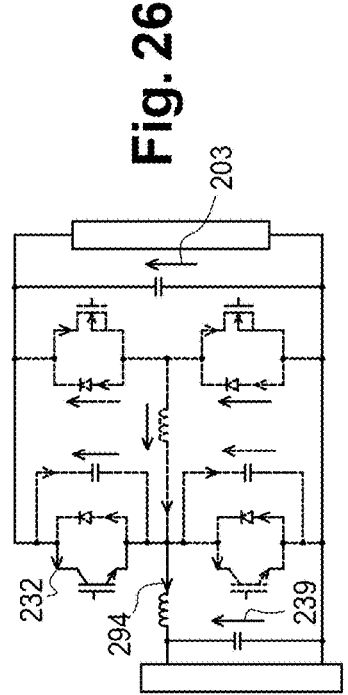

As soon as the reverse first primary current reaches the second secondary current value at the first rising edge, the second buck step runs and the first primary transistor 132 time conduction may be given by the control command corresponding to the duty cycle D as illustrated on FIG. 26).

Figure 27:
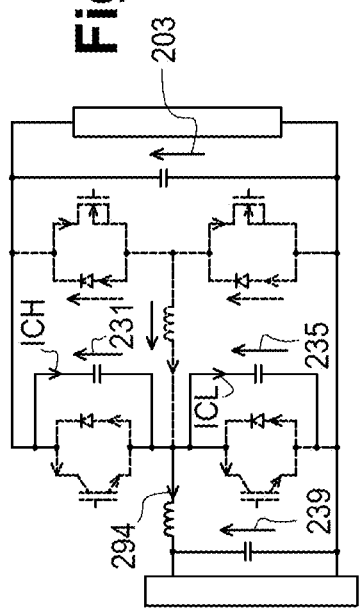

On FIG. 27), the end of the duty cycle D may be represented and the first primary switching unit 131, in particular the first primary transistor 132, may be turned OFF, and the turn off energy loss may be reduced because the current flows through the first and second capacitor 152*s* as shown on the same figure.

At the end of the second buck step, i.e. at the second falling edge, the first primary transistor 132 turns OFF, the direct first primary current 233 dropping may be a combination between the tail current from a bipolar transistor of the first primary transistor 132 and the first and second capacitor 152*s*.

In fact the time rate of change of potential $$\frac{dv}{dt_{OFF}}$$

may be dependent of the primary switching unit technology, in particular of the first primary switching unit 131 and second primary switching unit 135 and their junction temperatures. When the junction temperature growths, the tail current increases. This loss will be described later.

Figure 28:
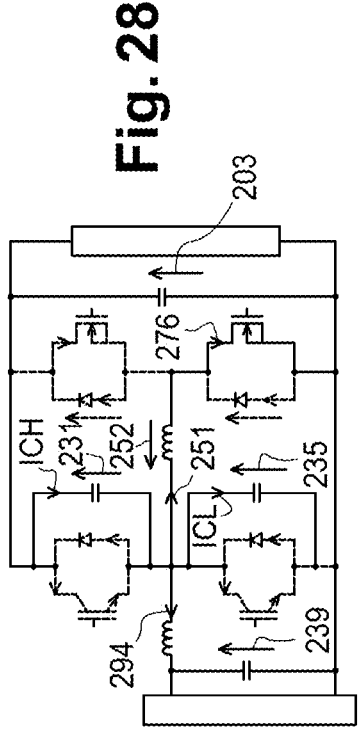

As soon as, the first and second capacitor 152*s* may be charged by the secondary current, FIG. 28), a third buck step starts and the second secondary switching unit 175, in particular the second secondary transistor 176, turns ON: this may be the third rising edge. In the present power converter 100, the conduction of the second secondary switching unit 175, in particular of the second secondary transistor 176, discharges the first and second capacitors 152 and the current flows through the inductor as shown the 31). Thus the primary switching unit turns ON always at zero voltage.

Figure 29:
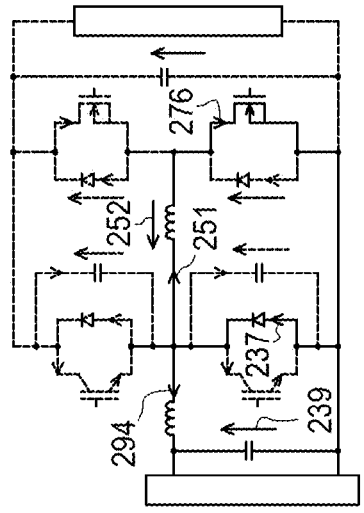
Figure 30:
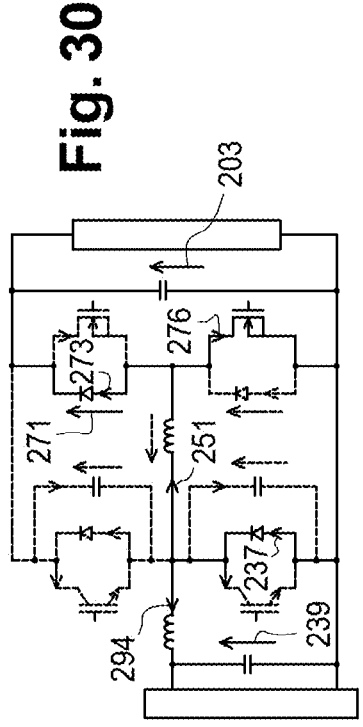

Shortly after the charge of the first and second capacitor 152, the second primary switching unit 135, in particular the second primary diode 137, conducts as represented on FIG. 29).

Figure 31:
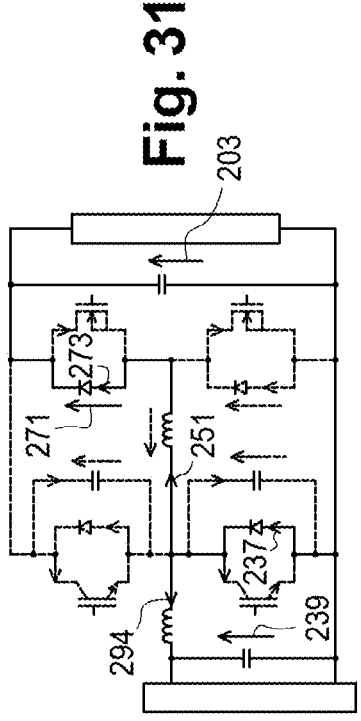

On a third falling edge, the second secondary switching unit 175, in particular the second secondary transistor 176, may be switched OFF and the inductor may be discharged through the second primary switching unit 135, in particular through the second primary diode 137, and the first secondary switching unit 171, in particular through the first secondary diode 173 as depicted on FIG. 31).

Figure 32:
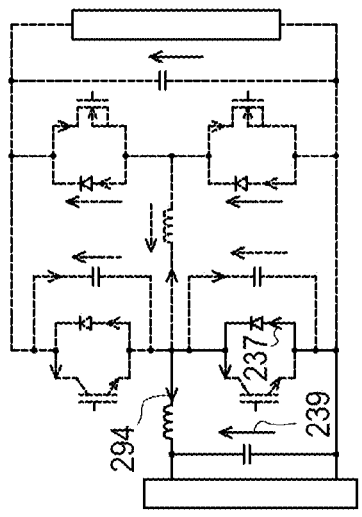

The second primary switching unit 135, in particular the second primary diode 137, conduct as shown on FIG. 32) and the period phase may be completed.

Also, during the first buck step and the third buck step, the power losses may be due to the conduction time of the second secondary switching unit 175 and first secondary switching unit 171, discharge of its intrinsic capacitors and the turn off energy, as shown the equation above.

The invention claimed is:

1. A bidirectional boost or buck power converter for converting an input primary power having an input primary voltage and an input primary current into an output secondary power having an output secondary voltage and output secondary current or an input secondary power having an input secondary voltage and an input secondary current into an output primary power having an output primary voltage and second primary current respectively; the power converter including at least one:
   primary switching arrangement comprising at least one primary switching unit having a primary dynamical switching loss;
   secondary switching arrangement comprising at least one secondary switching unit having a secondary dynamical switching loss; and,
   resonant unit connecting the at least one primary switching unit and the at least one secondary switching unit;
   the primary switching arrangement comprising at least a first primary switching unit including a first primary transistor and a first primary diode and a second primary switching unit including a second primary transistor and a second primary diode;
   the at least first primary switching unit being series connected to the second primary switching unit;
   the secondary switching arrangement comprising at least a first secondary switching unit including a first secondary transistor and a first secondary diode and a second secondary switching unit including a second secondary transistor and a second secondary diode;
   the at least first secondary switching unit being series connected to the second secondary switching unit;
   the resonant unit comprising an inductor and a first capacitor connecting a primary terminal and a secondary terminal, and a second capacitor connecting the primary terminal and a common terminal;
   the resonant unit having a natural frequency defined as a reciprocal of a product of the inductor by a sum of the first capacitor and second capacitor;
   a dimension of a component of the primary switching arrangement being larger than a dimension of a component of the secondary switching arrangement, such that the primary switching arrangement dissipates more heat than the secondary switching arrangement;
   the primary dynamical switching loss being higher than the secondary dynamical switching loss;
   the first primary transistor, the second primary transistor, the first secondary transistor, and the second secondary transistor having each a periodic control signal;
   the periodic control signal having a rising edge and a falling edge on each period of the periodic control signal;
   the falling edge of the periodic control signal of the second secondary transistor and the rising edge of the periodic control signal of the second primary transistor having a first time delay during which the first primary transistor, the second primary transistor, the first secondary transistor, and the second secondary transistor are all turned OFF;
   the first time delay being equal to a third of a ratio of pi to the natural frequency;
   the falling edge of the periodic control signal of the first secondary transistor and the rising edge of the periodic control signal of the first primary transistor having a second time delay, during which the first primary transistor, the second primary transistor, the first secondary transistor, and the second secondary transistor are all turned OFF;
   the second time delay being equal to a third of a ratio of pi to the natural frequency;
   the falling edge of the periodic control signal of the second primary transistor and the rising edge of the periodic control signal of the first secondary transistor having a third time delay during which the first primary transistor, the second primary transistor, the first secondary transistor, and the second secondary transistor are all turned OFF;

the third time delay being dependent on the primary switching unit technology;

the falling edge of the periodic control signal of the first primary transistor and the rising edge of the periodic control signal of the second secondary transistor having a fourth time delay during which the first primary transistor, the second primary transistor, the first secondary transistor, and the second secondary transistor are all turned OFF;

the fourth time delay being dependent on the primary switching unit technology;

the primary switching arrangement being connected to the primary terminal, the secondary terminal, and the common terminal;

the secondary switching arrangement being connected to the secondary terminal and to the common terminal; and the primary switching arrangement being electrically connected to the secondary switching arrangement in a continuous current mode via the secondary terminal and the common terminal.

2. The power converter according to claim 1, wherein the primary switching arrangement comprises at least the first primary switching unit and the second primary switching unit and/or wherein the secondary switching arrangement comprises at least the first secondary switching unit and the second secondary switching unit.

3. The power converter according to claim 1, wherein the at least one primary switching unit is a Gate Turn-OFF thyristor, Insulated-Gate Bipolar Transistor, Field Effect Transistor and/or Metal-Oxide-Semiconductor Field-Effect Transistor and/or the at least one secondary switching unit is a Field Effect Transistor and/or a Metal-Oxide-Semiconductor Field-Effect Transistor.

4. The power converter according to claim 1, wherein
the primary terminal is configured to connect a primary electrical component to the power converter;
the secondary terminal is configured to connect a secondary electrical component to the power converter; and
the common terminal is connected to the primary electrical component and to the secondary electrical component.

5. The power converter according to claim 1, wherein the primary switching arrangement comprises at least the first primary switching unit and the second primary switching unit and/or wherein the secondary switching arrangement comprises at least the first secondary switching unit and the second secondary switching unit.

6. The power converter according to claim 5, wherein the at least one primary switching unit is a Gate Turn-OFF thyristor, Insulated-Gate Bipolar Transistor, Field Effect Transistor and/or Metal-Oxide-Semiconductor Field-Effect Transistor and/or the at least one secondary switching unit is a Field Effect Transistor and/or a Metal-Oxide-Semiconductor Field-Effect Transistor.

7. The power converter according to claim 6, wherein the primary terminal is configured to connect a primary electrical component to the power converter;
the secondary terminal is configured to connect a secondary electrical component to the power converter;
the common terminal is connected to the primary electrical component and to the secondary electrical component.

8. A bidirectional boost or buck process for converting an input primary power having an input primary voltage and an input primary current into an output secondary power having an output secondary voltage and output secondary current or an input secondary power having an input secondary voltage and an input secondary current into an output primary power having an output primary voltage and second primary current respectively; the boost or buck process comprising at least a step of:

providing a power converter including at least one:
primary switching arrangement comprising at least one primary switching unit having a primary dynamical switching loss;
secondary switching arrangement comprising at least one secondary switching unit having a secondary dynamical switching loss; and,
resonant unit connecting the at least one primary switching unit and the at least one secondary switching unit;
the primary switching arrangement comprising at least a first primary switching unit including a first primary transistor and a first primary diode and a second primary switching unit including a second primary transistor and a second primary diode;
the at least first primary switching unit being series connected to the second primary switching unit;
the secondary switching arrangement comprising at least a first secondary switching unit including a first secondary transistor and a first secondary diode and a second secondary switching unit including a second secondary transistor and a second secondary diode;
the at least first secondary switching unit being series connected to the second secondary switching unit;
the resonant unit comprising an inductor and a first capacitor connecting a primary terminal and a secondary terminal, and a second capacitor connecting the primary terminal and a common terminal;
the resonant unit having a natural frequency defined as a reciprocal of a product of the inductor by a sum of the first capacitor and second capacitor;
a dimension of a component of the primary switching arrangement being larger than a dimension of a component of the secondary switching arrangement, such that the primary switching arrangement dissipates more heat than the secondary switching arrangement;
the primary dynamical switching loss being higher than the secondary dynamical switching loss;
the first primary transistor, the second primary transistor, the first secondary transistor, and the second secondary transistor having each a periodic control signal;
the periodic control signal having a rising edge and a falling edge on each period of the periodic control signal;
the falling edge of the periodic control signal of the second secondary transistor and the rising edge of the periodic control signal of the second primary transistor having a first time delay during which the first primary transistor, the second primary transistor, the first secondary transistor, and the second secondary transistor are all turned OFF;
the first time delay being equal to a third of a ratio of pi to the natural frequency;
the falling edge of the periodic control signal of the first secondary transistor and the rising edge of the periodic control signal of the first primary transistor having a second time delay, during which the first primary transistor, the second primary transistor, the first secondary transistor, and the second secondary transistor are all turned OFF;

the second time delay being equal to a third of a ratio of pi to the natural frequency;

the falling edge of the periodic control signal of the second primary transistor and the rising edge of the periodic control signal of the first secondary transistor having a third time delay during which the first primary transistor, the second primary transistor, the first secondary transistor, and the second secondary transistor are all turned OFF;

the third time delay being dependent on the primary switching unit technology;

the falling edge of the periodic control signal of the first primary transistor and the rising edge of the periodic control signal of the second secondary transistor having a fourth time delay during which the first primary transistor, the second primary transistor, the first secondary transistor, and the second secondary transistor are all turned OFF;

the fourth time delay being dependent on the primary switching unit technology;

the primary switching arrangement being connected to the primary terminal, the secondary terminal, and the common terminal;

the secondary switching arrangement being connected to the secondary terminal and to the common terminal;

the primary switching arrangement being electrically connected to the secondary switching arrangement in a continuous current mode via the secondary terminal and the common terminal; and switching OFF of the at least one secondary switching unit when a voltage across the at least one primary switching unit reaches a predetermined ratio of the output secondary voltage or the output primary voltage respectively.

9. The boost or buck process according to claim 8, wherein the predetermined ratio of the output secondary voltage or the output primary voltage respectively comprises between 20% and 80%.

10. The boost or buck process according to claim 8, wherein the voltage across the at least one primary switching unit is a voltage across the first capacitor or the second capacitor.

11. The boost or buck process according to claim 8, wherein the at least one secondary switching unit comprises an intrinsic characteristic controlling the time of the switching OFF step and the intrinsic characteristic is a gate resistor of the at least one secondary switching unit.

12. The boost or buck process according to claim 8, wherein the primary terminal is configured to connect a primary electrical component to the power converter;

the secondary terminal is configured to connect a secondary electrical component to the power converter;

the common terminal is connected to the primary electrical component and to the secondary electrical component; and wherein the voltage across the at least one primary switching unit reaches a voltage between the secondary terminal and the primary terminal.

13. The boost or buck process according to claim 12, wherein the voltage across the at least one primary switching unit reaches a voltage between the primary terminal and the common terminal.

14. The boost or buck process according to claim 8, wherein a current of the resonant unit reaches a maximum resonant current.

15. The boost or buck process according to claim 9, wherein the voltage across the at least one primary switching unit is a voltage across the first capacitor or the second capacitor.

16. The boost or buck process according to claim 8, wherein the predetermined ratio of the output secondary voltage or the output primary voltage respectively comprises between 40% and 60%.

17. The boost or buck process according to claim 8, wherein the predetermined ratio of the output secondary voltage or the output primary voltage respectively comprises between 45% and 55%.

* * * * *